United States Patent
Knoppert et al.

(10) Patent No.: US 11,960,783 B2
(45) Date of Patent: Apr. 16, 2024

(54) METHOD AND APPARATUS FOR EXTENDED REALITY HEAD MOUNTED DISPLAY DEVICE

(71) Applicant: Dell Products, LP, Round Rock, TX (US)

(72) Inventors: Michiel Sebastiaan Emanuel Petrus Knoppert, Amsterdam (NL); Thomas Marcus Hinskens, Utrecht (NL); Loo Shing Tan, Singapore (SG); Gerald Rene Pelissier, Mendham, NJ (US); Martin Douglas Sawtell, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 17/732,135

(22) Filed: Apr. 28, 2022

(65) Prior Publication Data
US 2023/0350620 A1 Nov. 2, 2023

(51) Int. Cl.
*G06F 3/14* (2006.01)
*G06F 3/01* (2006.01)

(52) U.S. Cl.
CPC ............... *G06F 3/14* (2013.01); *G06F 3/011* (2013.01)

(58) Field of Classification Search
CPC .................. G06F 3/14; G06F 3/011
See application file for complete search history.

(56) References Cited

U.S. PATENT DOCUMENTS

| | | | |
|---|---|---|---|
| 2018/0095498 A1* | 4/2018 | Raffle | G02B 27/0176 |
| 2022/0026724 A1* | 1/2022 | Law | G06F 3/011 |
| 2022/0261053 A1* | 8/2022 | Dory | A61F 7/00 |
| 2023/0334788 A1* | 10/2023 | Zohni | G06F 3/013 |

* cited by examiner

*Primary Examiner* — Kenneth B Lee, Jr.
(74) *Attorney, Agent, or Firm* — ProI Intellectual Property Law, PLLC; H. Kenneth ProI

(57) ABSTRACT

An extended reality (XR) head-mounted display (HMD) device includes a processor, a memory device, a battery, an HMD video display to present to a user an extended reality image of an environment, an HMD shield formed to be fitted around a user's eyes and to house the HMD video display, an HMD hood comprising a fabric shroud formed over a shroud frame operatively coupled to the HMD shield, and a head strap operatively coupled to the HMD shield via a shield hinge to secure the HMD device to the user's head.

20 Claims, 10 Drawing Sheets

METHOD AND APPARATUS FOR EXTENDED REALITY HEAD MOUNTED DISPLAY DEVICE

FIELD OF THE DISCLOSURE

The present disclosure generally relates to a head mounted display (HMD) device. The present disclosure more specifically relates to a lightweight HMD device that includes a head strap, an HMD hood, and an HMD shield used as a rigid housing.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may be operatively coupled to an extended reality (XR) device such as a head mounted display (HMD) device that allows a user to view a simulated XR environment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
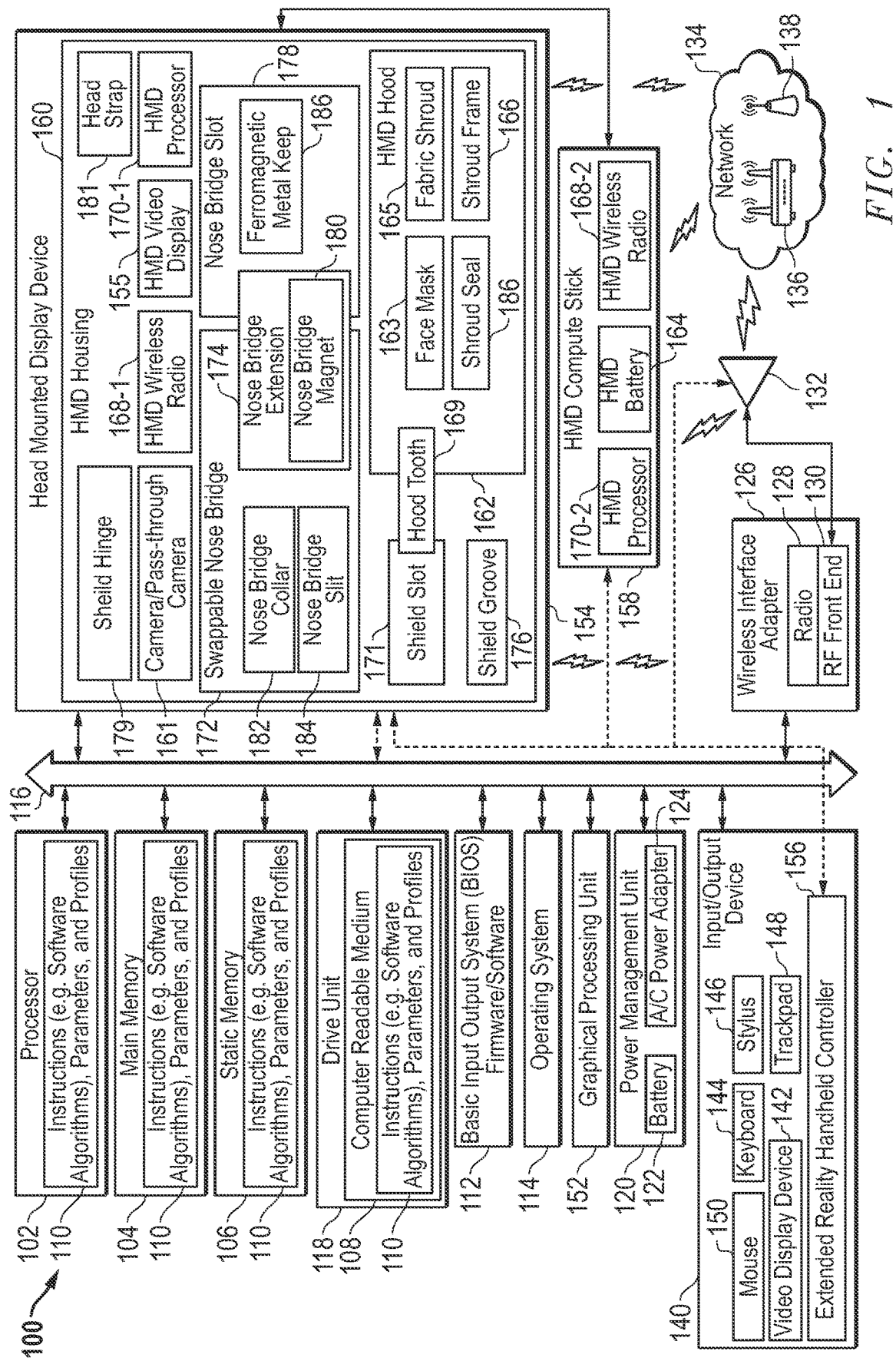
FIG. 1 is a block diagram of an information handling system with a head mounted display (HMD) device according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head mounted display (HMD) devices may be wearable around the user's head and/or eyes and have the capability of providing displayed or projected images to a user. In an example, a user may be provided with a completely virtual reality (VR) environment while using the HMD device. In another example, the HMD devices may allow the user to see through those displayed or projected images in, for example, augmented reality (AR) or mixed reality (MR). Indeed, HMD devices may be capable of generating any type of extended reality (XR) environment such as AR, VR, MR, or any other type of XR environment provided by the HMD device and contemplated to exist along a reality-virtuality continuum.

HMD devices may be used for a variety of tasks and purposes. For example, HMD devices may be used to engage in video games, videoconferences, distance learning, virtual manufacturing, immersive training, and simulation, three-dimensional (3D) visualization and review, guided or remote assist applications, and other tasks or processes that can be done virtually. During these tasks, the user may use the HMD device for an extended period of time and may need to be as comfortable as possible when wearing the HMD device.

The present specification describes an extended reality (XR) head-mounted display (HMD) device that includes a processor, a memory device, a power management unit (PMU), and an HMD video display to present to a user an extended reality image of an environment. The HMD device further includes, in various embodiments, an HMD shield fitted to be formed around a user's eyes, an HMD hood comprising a fabric shroud formed over a shroud frame operatively coupled to the HMD shield, and a head strap operatively coupled to the HMD shield via a shield hinge to secure the HMD device to the user's head.

In an embodiment, the HMD device may include a nose bridge that may be swappable with other nose bridges. The swappable nose bridge may include a nose bridge extension to fit within a nose bridge slot formed into the HMD housing and a nose bridge magnet formed at the nose bridge extension to magnetically engage within the nose bridge slot formed in the HMD housing.

The shroud frame, in an embodiment, may include one or more hood teeth formed on the shroud frame to operatively couple the HMD hood to the HMD shield via a shield slot formed in the HMD shield. The hood teeth are used to secure the HMD hood to the other parts of the HMD device such as the HMD shield. In an embodiment, a face mask may be operatively coupled to the shroud frame and provide a comfortable contact surface against the user's face when the HMD device is worn. The shroud frame of the HMD hood may further include a shroud seal formed on the shroud frame to interface with a shield groove formed on the HMD shield, the shroud seal to make an interior of the HMD hood lightproof by limiting or restricting light into the HMD hood in an embodiment. The fabric shroud, in an embodiment, may be draped over and secured (e.g., via fasteners, fabric welding, glue, etc.) to the shroud frame and may include a first layer including directionally-oriented moisture wicking fibers, a second layer including fibers woven in a first direction, and a third layer including fibers woven in a second direction different from the first direction. It is understood that the HMD hood is designed to restrict or limit light leaking into the HMD hood when the HMD device is worn by the user for improved viewing of XR images and XR environment in embodiments herein. For purposes herein, the prevention or limitation on light entering the HMD hood is referred to as lightproofing or making nearly lightproof although some light may leak in in some circumstances.

The method of forming the HMD device may include forming the swappable nose bridge, the HMD hood, and the HMD shield in an example embodiment. These pieces of the HMD device may be operatively coupled together and a head strap may be attached to a set of shield hinges for tilt of the had strap for comfort of the user in one embodiment. The head strap may also be adjustable by the user to fit around the user's head in an embodiment.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a convertible laptop, a tablet, a smartphone, a desktop computer, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with an HMD device 154 and provide data storage resources, processing resources, and/or communication resources to the HMD device 154 as described herein. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU), processing, hardware, controller, or any combination thereof. Additional components of the information handling system 100 can include one or more storage devices, one or more communications ports for communicating with external devices, as well as, various input and output (I/O) devices 140, such as a keyboard 144, a mouse 150, a video display device 142, a stylus 146, a trackpad 148, and an XR handheld controller 156, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 and HMD device 154 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, an HMD application or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, a XR handheld controller 156, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a GUI representing the execution of a word processing application, a GUI representing the execution of a spreadsheet application, a GUI representing the execution of a computer-aided design application, a GUI representing the execution of a gaming application, a GUI representing the execution of an email application, and a GUI representing the execution of a web browsing application, an image generation application such as presentation software, or a drawing program, among others. In an embodiment, each of these windows or other images may be represented on the HMD video display 155 of the HMD device 154 in an XR environment when the HMD device 154 is being used by the user. The presentation of these windows on the HMD video display 155 may be accomplished via execution of an application programming interface (API) in coordination with the HMD processor 170-1, 170-2. In an embodiment, the information handling system 100 may include one or more APIs that allow the information handling system 100 to cause certain applications to be executed on the HMD device 154. These APIs may be associated with one or more sets of instructions (e.g., software algorithms), parameters, and profiles 110 that, during execution of an XR environment at the HMD device 154, causes these applications to be represented to the user within the XR environment. For example, a gaming application being executed by the processor 102 of the information handling system 100 may include an API that, when the HMD device 154 is being used by the user, allows that application to be executed at the HMD device 154 with the user being allowed to interact with the gaming application and maintain updates to changes made in the XR environment. It is appreciated that other types of applications may also be associated with APIs that allow those applications to be reproduced in an XR environment at the HMD device 154 including word processing applications, drawing applications, videoconferencing applications, among others.

In an embodiment, the information handling system 100 may be local to the user who may operate the HMD device 154. The information handling system 100 and/or HMD device 154 are operatively coupled to a network 134 via a wireless interface adapter 126 or a wireless interface adapter within the HMD device 154 via an HMD wireless radio 168-1, 168-2, respectively. In an embodiment, the HMD device 154 and XR handheld controller 156 may be operatively coupled to one another and, optionally, to the information handling system 100 either via a wired or wireless connection such as Bluetooth, Bluetooth extended, or other protocol as described herein.

The network interface device of the information handling system 100 shown as wireless interface adapter 126 can provide connectivity among devices such as with Bluetooth or Bluetooth extended or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 and/or the HMD device 154 (e.g., via the HMD wireless radio) to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100 and, in an embodiment, the HMD device 154. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 and HMD wireless radio 168 may provide connectivity to one or more of the peripheral devices that may include a wireless video display device 142, a wireless keyboard 144, a wireless mouse 150, a wireless headset such as the HMD device 154, a microphone, an audio headset, a wireless stylus 146, and a wireless trackpad 148, among other wireless peripheral devices used as input/output (I/O) devices 140 including any XR handheld controller 156 associated with the HMD device 154. In an embodiment, the HMD device 154 may include a wireless radio and an antenna to wirelessly couple the HMD device 154 to the information handling system 100 via the antenna 132 and radio 128. In an embodiment, the HMD device 154 may operate with Bluetooth or Bluetooth extended radio protocols. In other embodiments, the HMD device 154 may operate with Wi-Fi 802.11 radio protocol, 5G NR radio protocols, or other wireless protocols. In an embodiment, an antenna controller operatively coupled to an operating system (OS) 114 may concurrently transceive data to and from various wireless devices such as the HMD device 154 or network 134 while an HMD processing device 170-1, 170-2 of the HMD device 154 executes the applications being used in operation with the HMD device 154. In an embodiment, the processing device that executes the applications along with other processes associated with the operation of the HMD device 154 may be a processing device on the information handling system 100 (e.g., processor 102, GPU 152, among others described herein), at the HMD device 154 (e.g., HMD processor 170-1), at an HMD compute stick 158 (e.g., HMD processor 170-2) or a combination of processors on these devices. In one optional embodiment, the HMD device 154 may be operatively coupled to the information handling system 100 via a wired connection to the bus 116, via, for example, a port in the information handling system 100.

The XR handheld controller 156 may be a peripheral input/output device 140 used by the user to interact with virtual images presented to the user via the HMD device 154. In an embodiment, the XR handheld controller 156 may be operatively coupled to the information handling system 100 via a wireless connection using the wireless interface adapter 126 operatively coupled to the bus 116. In this embodiment, input signals from the XR handheld controller 156 may be relayed to the processor 102, the HMD processor 170, or other processing device and used as input to manipulate an XR image presented to the user at the HMD device 154. In an optional embodiment, the XR handheld controller 156 may be operatively coupled to the bus 116 via a wired connection and receive this input as described. In another embodiment, the XR handheld controller 156 may be operatively coupled to the HMD device 154 via a wireless connection via operation of the HMD wireless radio 168 communicating with the radio 128 of the information handling system 100 or a wireless module on the XR handheld controller 156. In an example embodiment, the XR handheld controller 156 may provide input to a processing device (e.g., HMD processor 170-1) at the HMD device 154 to manipulate an XR image presented to the user at the HMD device 154. In another example embodiment, the XR handheld controller 156, being operatively coupled to the bus 116 or wireless interface adapter 126, may provide input to the processor 102 of the information handling system 100 to manipulate an XR image presented to the user at the HMD device 154. In one example embodiment, the GPU 152 of the information handling system 100 may be used to process and generate the graphics used to create the XR environment at the HMD device 154 as well as process those signals received by the XR handheld controller 156.

As described, the wireless interface adapter 126 and the HMD wireless radio 168-1, 168-2 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth wireless link using a Bluetooth wireless protocol. In an embodiment, the Bluetooth wireless protocol may operate at frequencies between 2.402 to 2.48 GHz. Other Bluetooth operating frequencies are also contemplated in the presented description such as Bluetooth extended frequencies at 6 GHz or others. In an embodiment, a Bluetooth wireless link may be used to wirelessly couple the input/output devices operatively and wirelessly including the XR handheld controller 156, mouse 150, keyboard 144, stylus 146, trackpad 148, and/or video display device 142 to the bus 116 in order for these devices to operate wirelessly with the information handling system 100. In a further aspect, the wireless interface adapter 126 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In a specific embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands. As described herein, the HMD device 154 also includes an antenna system (e.g., HMD wireless radio 168-1, 168-2) used to transceive data to and from the information handling system 100 using these wireless communication protocols described herein. Additionally, or alternatively, the HMD wireless radio 168-1, 168-2 within the HMD device 154 may be used to communicate wirelessly with a remote server at the network 134 via an access point 136 or base station 138.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1

(NRFR1), NRFR2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 or an HMD wireless radio 168-1, 168-2 may include one or more radio frequency subsystems including transmitters and wireless controllers for connecting via a multitude of wireless links. In an example embodiment, an information handling system 100 may have an antenna system transmitter for Bluetooth, 5G small cell WWAN, or Wi-Fi WLAN connectivity and one or more additional antenna system transmitters for macro-cellular communication. The RF subsystems and radios 128 and for the HMD wireless radio 168 include wireless controllers to manage authentication, connectivity, communications, power levels for transmission, buffering, error correction, baseband processing, and other functions of the wireless interface adapter 126 and for the HMD wireless radio 168.

In an embodiment, the HMD device 154 may include its own XR software platform and applications. For example, the HMD device 154 may include a game engine such as Unity® developed by Unity Technologies or Unreal® developed by Epic Games that may be used to help design the XR software used to operate the HMD device 154. The HMD device 154 may also include standards such as Open XR® developed by Khronos Group that allows developers to build applications that may work across a variety of HMD devices 154. Development kits such as Vuforia®, Nvidia Omniverse® developed by Nvidia GTC, ARCore® developed by Google, Qualcomm XR® developed by Qualcomm, may also be executed by the HMD device 154 in order to provide for the development of AR applications and mark less tracking algorithms and computer code to be executed by the HMD device 154. These kits and standards, among others, may be used to develop executable program code and provide content to the user at the HMD device 154.

In an embodiment, the HMD device 154 may include its own wireless interface adapter, radio, antenna front end, and antenna such as the HMD wireless radio 168-1, 168-2. This may allow the HMD device 154 to communicate with the information handling system 100 or, alternatively, directly to a network maintaining a remote server used to provide the XR environment to the user (e.g., software as a service, storage as a service, processing as a service). As such, this wireless interface adapter, radio, antenna front end, and antenna of the HMD wireless radio 168-1, 168-2 may conserve processing resources of the HMD processor 170-1, 170-2 and/or processor 102/GPU 152 of the HMD device 154 and information handling system 100 if necessary. With the wireless interface adapter, radio, antenna front end, and antenna of the HMD wireless radio 168-1, 168-2 of the HMD device 154, the HMD device 154 may communicate with the information handling system 100 or the network 134 via an out-of-band (OOB) communication channel, for example. The OOB communication may initially facilitate the communication of the HMD device 154 with the information handling system 100 or some external sensors via, for example, Bluetooth, Bluetooth extended or Wi-Fi or Wi-Fi extended communication protocols. In an embodiment, the OOB communication may also be accomplished using those wireless communication protocols described in connection with the operation of the wireless interface adapter 126. In an embodiment, this OOB communication may occur below the basic input/output system (BIOS) 112 or OS 114 allowing the communication to proceed in the background of other processes being executed by the processor 102 or other processing device such as the GPU 152. This allows the processing resources of the processor 102 or GPU 152 of the information handling system 100 or the processing devices of the HMD device 154 to be conserved for other processing tasks associated with the processing of XR images and data associated with the display of those images to the user via the video display of the HMD device 154.

During operation, the information handling system 100 may communicate with the HMD device 154 either via a wired connection or wirelessly as described herein. The operation of the HMD device 154 may not be dependent on the information handling system 100 being in operation, in an embodiment, and the HMD device 154 may be used by the user whether the information handling system 100 is operatively coupled to the HMD device 154 or not, in some embodiments.

In an embodiment, the HMD device 154 may include the necessary hardware used to display an XR image of a surrounding physical environment while tracking the location of the HMD device 154 (and the user) within the physical environment. This hardware used may vary depending on the type of process used to display the XR image to the user. Example processes may be grouped into two general categories: inside-out positional tracking processes and outside-in tracking processes. Although, the present specification contemplates the use of outside-in tracking processes (e.g., tracking cameras and sensors placed outside of the HMD device 154), for convenience in description, the present specification describes an HMD device 154 the operates using an inside-out process of tracking the HMD device 154. With the inside-out process of tracking the HMD device 154, the HMD device 154 includes a camera/pass-through camera 161 and other sensors used to determine the location of the HMD device 154 as it moves within an environment, in an embodiment. In an embodiment, the HMD device 154 may include positional sensors such as a global positioning system (GPS) unit, an inertial measurement unit (IMU), an e-Compass unit, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photo-diode array, a piezo-electric transducer, a proximity sensor, a rotary encoder, a seismic displacement pick-up, and a string potentiometer, along with any other positional sensors developed in the future. The positional sensors (e.g., GPS unit, IMU, and/or eCompass unit) in an embodiment may operate to measure location coordinates (x, y, z) of the HMD device 154, as well as orientation (0), velocity, and/or acceleration. Velocity, acceleration, and trajectory of the HMD device 154 in such an embodiment may be determined by comparing a plurality of measured location coordinates and orientations taken over a known period of time, or may be measured directly by onboard positional sensor such as an accelerometer. Additionally, or alternatively, Wi-Fi triangulation or other wireless multilateration may be used that uses the characteristics of nearby Wi-Fi hotspots and other wireless access points 136 or base station nodes 138 to discover where within an environment the HMD device 154 is located. Additionally, or alternatively, an Internet-of-Things (IoT) device may be used that include sensors that may be detectable by the HMD device 154 and provides data to the HMD device 154 that it is within a physical environment.

In an embodiment, a simultaneous localization and mapping (SLAM) engine executing a SLAM process (described herein), the IoT devices, and the Wi-Fi hotspot triangulation process may all be used as data inputs to the head mounted display CPU/GPU, the processor 102 of the information handling system 100, or other operatively coupled processing resource to better determine the initial configuration and location of the HMD device 154. In an embodiment, the OOB communication channel may help to communication wirelessly with some of these sensors when determining the location of the HMD device 154. Again, in an embodiment, the HMD device 154 may include an embedded controller that operates this OOB communication link so that this communication may be conducted below the operating system of the HMD device 154. This prevents the HMD processor 170-1, 170-2 (e.g., a processor, GPU, CPU, or other microcontroller, etc.) from having to receive and compute this data leaving the HMD processor 170-1, 170-2 to conduct, for example, the SLAM computations described herein.

The HMD device 154 may also be capable of capturing video or still images of its surrounding environment, which may include one or more identifiable landmarks. For example, the HMD device 154 may include one or more cameras such as the camera/pass-through camera 161. These cameras may capture two-dimensional images of the surrounding environment, which may be combined with distance measurements gathered by a plurality of, for example, IR emitters and detectors to generate a three-dimensional image of the surrounding environment. The cameras, in an embodiment, may be, for example, a stereo triangulation or trilateration camera, an Infrared (IR) camera, a sheet of light triangulation camera, a structured light camera, a time-of-flight or time of arrival camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image generated by a processing device (e.g., the HMD processor 170-1, 170-2, GPU 152, or processor 102 and the like) in an embodiment may be used to determine the position and orientation of the HMD device 154 with respect to the one or more landmarks with respect to the physical surroundings as well as any virtual images in a projected XR setting on the HMD device 154.

In an embodiment, a processing device either on the HMD device 154 (e.g., HMD processor 170-1, 17-2) itself or the processor 102 in operative communication with the HMD device 154 may process this received data from these sensors and the camera in order to facilitate the presentation of an XR image of a surrounding environment to a user via a video display on the HMD device 154 as described herein. This may be done using, for example the SLAM process. The SLAM process, in an embodiment, may be employed in order to identify the position of the HMD device 154 with respect to its surrounding environment, model the surrounding environment as viewed from the perspective of the headset wearer, and render the modeled image in a three-dimensional environment matching the surrounding real-world environment. The surrounding environment may be virtual or some combination of physical and virtual for XR. It does this by a processing device (e.g., processor 102 or the HMD processor 170-1, 170-2 of the period HMD device 154) executing computer readable program code describing an algorithm that concurrently maps a surrounding XR environment the HMD device 154 is within and detects the position of the HMD device 154 within that surrounding XR environment. IR emitters and sensors housed within or mounted on the exterior surfaces of the HMD device 154 may measure such distances in an embodiment. IR emitters and sensors may be mounted in all directions around the exterior surface of the HMD device 154, in some embodiments. In other embodiments, only portions of the exterior surfaces of the wearable headsets may have infrared emitters and sensors or cameras. For example, the HMD device 154 may emit IR light in a pattern toward the physical landmark, the HMD device 154 may emit IR light, and/or the HMD device 154 may emit IR light toward the physical landmark. The cameras mounted to the HMD device 154 may then capture an image of each of the IR lights reflecting off the surfaces of the physical landmark. If the surrounding environment further includes other ambient light sources, the cameras will also detect illumination from the physical landmark reflecting such ambient light. For example, if desk lamp and/or floor lamp are turned on, the physical landmark in an embodiment may reflect ambient light generated by the lamps.

The depth of surfaces of nearby objects may be determined by analyzing the way in which the pattern of emitted IR light is distorted as it reaches surfaces of varying distances from the headset. For example, the HMD device 154 may determine the depth of the physical landmark by analyzing the way in which the pattern of emitted IR light is distorted as it reaches the surfaces of physical landmark. Similarly, the HMD device 154 may determine the depth of the physical landmark by analyzing the way in which the pattern of emitted IR light is distorted as it reaches the surfaces of physical landmark, and the HMD device 154 may determine the depth of the physical landmark by analyzing the way in which the pattern of emitted IR light is distorted as it reaches the surfaces of physical landmark. With this data and the other data from the other sensors described herein, the processing device may execute the algorithm defining the SLAM process in order to render to a user via the video display of the HMD device 154 an XR image based on a rendered image from the model generated and referenced movement within the surrounding XR environment based on movement of the HMD device 154 relative to physical landmarks.

During operation of the information handling system 100, the user may want to interact with the applications currently being executed on the HMD video display 155 by the HMD device 154. To do so, the user may wear the HMD device 154 by aligning the HMD video display 155 with the user's eyes thereby placing an HMD shield 160 against the user's face surrounding the user's eyes. A head strap 181 operatively coupled to the HMD shield 160 via a shield hinge 179 may then be secured around the back of the user's head thereby securing the HMD device 154 to the user's head. In an embodiment, the shield hinge 179 may allow the HMD shield 160 to be oriented relative to the head strap 181 is angled on the user's head. The head strap 181 is operatively coupled to the shield hinge 179. In an embodiment, the HMD shield 160 may include a face mask 163 that is a padded surface that contacts the user's face to provide additional comfort to the user when the HMD device 154 is being worn.

In order to also make the user more comfortable, the HMD device 154 may include a swappable nose bridge 172. The swappable nose bridge 172 may be a removable part of the HMD shield 160 that contacts the user's nose when the HMD device 154 is placed on the user's head. In an embodiment, the swappable nose bridge 172 may be one of a plurality of swappable nose bridges 172 available to the user to operatively couple to the HMD shield 160. These plurality of swappable nose bridges 172 may be of different sizes, shapes, or colors to accommodate the user or a plurality of user's when interfacing with the HMD device 154. For example, a first user may have a relatively smaller nose than a second user and the plurality of swappable nose bridges 172 may be differentiated by different sizes and shapes to accommodate these differences in physiology between, in this example, the first user and the second user. In an embodiment, the plurality of swappable nose bridges 172 may be of different colors or may include other differentiating features (e.g., symbols) that allow a user to know which of the plurality of swappable nose bridges 172 belongs to that size or user. Using the HMD device 154 may cause different bacteria or viruses to be transmitted from one user to another. In order to mitigate this, each user may use their own swappable nose bridge 172 that is differentiated by color, for example, in order for the user to readily swap in their assigned or owned swappable nose bridge 172 to use with the HMD device 154.

As described herein, the swappable nose bridge 172 may be operatively coupled to the HMD shield 160. As described herein, the HMD shield 160 of the HMD device 154 may include a nose bridge slot 178. This nose bridge slot 178 may receive a nose bridge extension 174 of the swappable nose bridge 172. The nose bridge extension 174 may be sized to fit within the nose bridge slot 178 easily so that the user may exchange one of a plurality of swappable nose bridges 172 with another where, for example, the first user needs to have a swappable nose bridge 172 that is owned by the user or sized to fit the user as described herein. In an embodiment, the nose bridge extension 174 may be sized to create an interference fit within the nose bridge slot 178. The level of interference fit may be such that the swappable nose bridge 172 is not easily separatable from the HMD shield 160 except by the user applying sufficient force to remove the nose bridge extension 174 from within the nose bridge slot 178.

In an embodiment, the nose bridge extension 174 may include a nose bridge magnet 180. The nose bridge magnet 180 may interface with a metal portion within the nose bridge slot 178 such as a ferromagnetic metal keep 186 or with a magnet of opposite polarity in the nose bridge slot 178. In an embodiment, the ferromagnetic metal keep 186 may be made of a ferromagnetic material that magnetically interacts with the nose bridge magnet 180 to help secure the nose bridge extension 174 within or attached to the nose bridge slot 178 and, accordingly, the swappable nose bridge 172 to the HMD shield 160. In an embodiment, the nose bridge magnet 180 may be embedded within the nose bridge extension 174. In an embedded embodiment, the material of the swappable nose bridge 172 may conceal the presence of the nose bridge magnet 180. In an embodiment, the swappable nose bridge 172 may be manufactured by placing the nose bridge magnet 180 within a mold and the material forming the swappable nose bridge 172 may be injection molded into the mold to secure the nose bridge magnet 180 within the nose bridge extension 174. In an embodiment, the material forming the swappable nose bridge 172 may be a pliable plastic, silicone, rubber, or synthetic rubber that is capable of being injection molded into a mold, for example. In the case where rubber, silicone, or synthetic rubber is used, the surface of the rubber, silicone, or synthetic rubber may increase the friction between the surfaces of the swappable nose bridge 172 and the user's nose. This may increase the ability of the swappable nose bridge 172 and the HMD device 154 to be retained on the user's face and not move on the user's face while in use. In an embodiment, the nose bridge magnet 180 may be a ferromagnetic magnet, a neodymium magnet, or any other type of permanent magnet.

In an embodiment, the swappable nose bridge 172 may include a nose bridge collar 182. The nose bridge collar 182 may be a portion of the swappable nose bridge 172 that conforms to an outside surface of the HMD shield 160. The nose bridge collar 182 may conform to the outside surface of the HMD shield 160 in order to prevent light from entering the area between the HMD video display 155 and the user's eyes thereby creating a nearly lightproof environment. By providing this nearly lightproof environment via the nose bridge collar 182, the user may better see the images and video presented to the user via the HMD video display 155. In an embodiment, the nose bridge collar 182 may be formed within the mold used to form the swappable nose bridge 172 as described herein. In an embodiment, the nose bridge collar 182 may abut any portion of the HMD shield 160 including a face mask 163 that abuts the user's face when the HMD device 154 is being worn.

In an embodiment, the swappable nose bridge 172 may include a nose bridge slit 184 formed through a portion of the swappable nose bridge 172. The nose bridge slit 184 may be formed along a portion of the swappable nose bridge 172 where a ridge of the user's nose may contact the swappable nose bridge 172. The nose bridge slit 184 may, in an embodiment, create two nose bridge flaps that separate the portion of the swappable nose bridge 172 that contacts the user's nose when the HMD device 154 is being worn. In an embodiment, the nose bridge flaps formed by the nose bridge slit 184 may include a shape memory alloy internal structure such as a rod, sheet, wire or other structure embedded in the nose bridge flaps to allow a portion of the nose bridge contacting the user's nose to be elastically deformed or adjusted to conform to a shape of the user's nose. This shape memory alloy rod, sheet, wire, or other structure may be made of, for example, metal alloys that includes one or more of copper, aluminum, cadmium, nickel, gallium, gold, iron, silicon, beryllium, palladium, zinc, platinum, niobium, hafnium, manganese, cobalt, tin, among other metals and non-metals in different proportions. In an embodiment, a sheet of shape memory alloy structure may be embedded into the nose bridge flaps created by the nose bridge slit 184. In an embodiment, the shape memory alloy rod, sheet, wire, or other structure may be embedded into the nose bridge flaps using the injection molding process described herein. In an embodiment, the injection molding process may include inserting the rod, sheet, wire, or other structure of shape memory alloy into a mold and injecting a pliable plastic, silicone, rubber, or synthetic rubber into the mold and secure the structures of the shape memory alloy into the nose bridge flaps. In an embodiment, this injection molding process may be completed concurrently with the injection molding process used to secure the nose bridge magnet 180 within the nose bridge extension 174 as described herein. The shape memory alloy structure formed into the nose bridge flaps allows the portions of the swappable nose bridge 172 that touches the user's nose to be elastically deflected to conform to the surface of the user's nose. This increases the adjustability and comfortability of the swappable nose bridge 172 as the HMD shield 160 is placed on the user's head.

Additionally, in order to reduce the weight of the HMD device 154, the HMD device 154 includes an HMD hood 162 with breathable, light-weight fabric in an example embodiment. The HMD hood 162 is used to provide a darkened viewing area for better viewing results of the HMD video display 155 during presentation of an XR environment and XR images. Less ambient light improves the viewing experience for the user. Typically, HMD devices includes a large outer housing, usually made of plastic that houses the hardware of the HMD device and wraps around the sides of the user's head when worn. This extra-sized housing adds weight and bulkiness to the HMD device 154 and can contribute to fatigue to the user as the user wears the HMD device 154. The HMD hood 162 may replace a portion of the typical hard wrap-around, plastic housing of the HMD device and reduce the weight on a user's face or head.

In order to reduce the weight of the HMD device 154, the HMD hood 162 may include a fabric shroud 165 formed over a shroud frame 166. The shroud frame 166 may be a lightweight piece of pliable and bendable plastic that is skeletonized and includes one or more supporting members for the fabric shroud 165 to be draped over the shroud frame 166. This reduces the amount of materials used to form the HMD hood 162 as well as reduce the amount of weight of the HMD hood 162 and, accordingly, the HMD device 154. The fabric shroud 165 may be made of any material that prevents light from entering through the HMD hood 162 and into the user-viewing area within the HMD device 154 such as that area between the user's eyes and the HMD video display 162 when the HMD device 154 is being worn. In one embodiment, the fabric shroud 165 includes any number of layers, for example three layers of fabric. A first fabric shroud layer may include directionally-oriented moisture wicking fibers. During operation of the HMD device 154, a user and the HMD video display 162 may generate an amount of heat within the HMD hood 162. Along with this heat, the user may perspire or fluids in the user's eyes may evaporate into the user-viewing area. This evaporation creates microscopic droplets of sweat and other fluids that are trapped within the user-viewable area and may fog the lenses of the HMD video display 162 or be uncomfortable for a user. However, the first fabric shroud layer includes directionally-oriented moisture wicking fibers that traps these microscopic droplets of sweat and other fluids and wicking them out of and away from the user-viewing area. The directionally-orientated moisture wicking fibers may be arranged to wick the moisture to a less dense portion of the first fabric shroud layer that is away from the user-viewing area. This first fabric shroud layer may, therefore, prevent condensation from building up inside the HMD hood 162, prevent fogging of the HMD video display 162, and prevent an uncomfortable physical environment for the user.

The fabric shroud 165 may further include, in an embodiment, a second layer and a third layer each used to prevent light from entering the HMD hood 162 and into the user-viewing area. The second layer may include fibers that are woven in a first direction while the third layer includes fibers woven in a second direction that is different from the first direction. In an embodiment, the direction of the woven fibers of the second layer and the third layer may be perpendicular to each other so that light may not pass through the HMD hood 162. The weave of the second layer and third layer may be sufficient to allow the moisture wicked away from inside the HMD hood 162 by the first fabric shroud layer to pass through the second layer and third layer.

The HMD hood 162 may further include one or more hood teeth 169 formed on the shroud frame 166 of the HMD hood 162. In an embodiment, a first hood tooth 169 may be formed on a distal top edge of the shroud frame 166. In an embodiment, a second hood tooth 169 may be formed on a distal bottom edge of the shroud frame 166. With the first hood tooth 169 on a top distal edge of the shroud frame 166 and the second hood tooth 169 at a distal bottom edge of the shroud frame 166, the shroud frame 166 may be elastically bent so that the hood teeth 169 are separated further from each other. In an embodiment, the hood teeth 169 may be placed within a shield slot 171 formed in an HMD shield 160 portion of the HMD device 154. The user may then release the shroud frame 166 allowing the hood teeth 169 to seat into their respective shield slots 171 thereby securing the HMD hood 162 to the HMD shield 160 and the other parts of the HMD device 154. This allows a user to easily swap out a first HMD hood 162 for a second HMD hood 162 for replacement of a worn or damaged HMD hood 162 or for cleaning in some embodiments. In another example embodiment, the HMD device 154 may be provided with a plurality of different sized or extra HMD hoods 178. The different sizes of HMD hoods 178 may allow a user to select, from among the plurality of HMD hoods 178, a single HMD hood 162 that is sized for the user's face the best. Additionally, each user of a plurality of users may select a specific HMD hood 162 to be used by the user throughout the lifetime of the HMD device 154. This may allow multiple users to operate the HMD device 154 using their own HMD hood 162 and any face mask 163 in some embodiments. During use, the users operating the HMD device 154 may perspire or otherwise create a situation where bacteria or viruses can be spread. In order to mitigate this transmission of bacteria or viruses, each user of the HMD device 154 may be assigned an HMD hood 162 with their own face mask 163 that the users may use with the HMD device 154. The easy removal and coupling of the HMD hood 162 to the HMD shield 160 described herein, allows for the user to easily remove their assigned HMD hood 162 after using the HMD device 154 allowing the next user to couple their assigned HMD hood 162 to the HMD shield 160 of the HMD device 154. Further, the easily installation and removal of the HMD hoods 178 enables easy cleaning or replacement of the HMD hood 162 by the user.

In an embodiment, the shroud frame 166 may further include a shroud seal 186 formed along a surface of the shroud frame 166 that abuts portions of the HMD shield 160 of the HMD device 154. The shroud seal 186 may be a portion of the shroud frame 166 that conforms to a surface of the HMD shield 160 when the HMD hood 162 is installed. In an embodiment, the HMD shield 160 includes a shield groove 176 that interfaces with the shroud seal 186 formed on the shroud frame 166 of the HMD hood 162. This interfacing between the shroud seal 186 and shield groove 176 prevents light from entering into the user-viewing area within the HMD hood 162 thereby making the HMD hood 162 nearly lightproof.

As described herein, the HMD hood 162 may include a face mask 163 used to abut a user's face when the HMD device 154 is worn. The face mask 163 may be made of a pliable material such as a foam or silicone in order to soften the interface between the HMD device 154 and the user's face making the wearing of the HMD device 154 more comfortable to the user. In an embodiment, the shroud frame 166 may include a frame bead formed along a proximal edge of the shroud frame 166. The frame bead may interface with a bead channel formed along a length of the face mask 163 that allows the face mask 163 to be wrapped around the frame bead securing the face mask 163 to the HMD hood 162. In an embodiment, the shroud frame 166 may also be made of a pliable plastic that bends to conform to a user's face when the HMD device is worn by the user.

In an embodiment, processing, power systems/battery, or data storage resources of the HMD device 154 may be placed at an HMD compute stick 158. In this embodiment, the HMD compute stick 158 includes the hardware such as an HMD processor 170-2 (GPU/video processor), a data storage device, a power management unit, a power source (e.g., an HMD battery 164), an HMD wireless radio 168-2 among other hardware that may be operatively coupled to the HMD device 154 but could be placed offsite from the HMD device 154 in order to reduce the weight of the HMD device 154 as it rests on the user's head. This HMD compute stick 158, in an embodiment, may include a strap or other securing device that allows the user to secure the HMD compute stick 158 to the user's body (e.g., an arm) when operating the HMD device 154. In an embodiment, this offsite HMD compute stick 158 may be operatively coupled to the HMD video display 155 of the HMD device 154 in order to provide video/image data to the user during use.

The information handling system 100 can include one or more set of instructions 110 that can be executed to cause the computer system to perform any one or more of the methods or computer-based functions disclosed herein. For example, instructions 110 may execute a XR software applications or APIs, various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
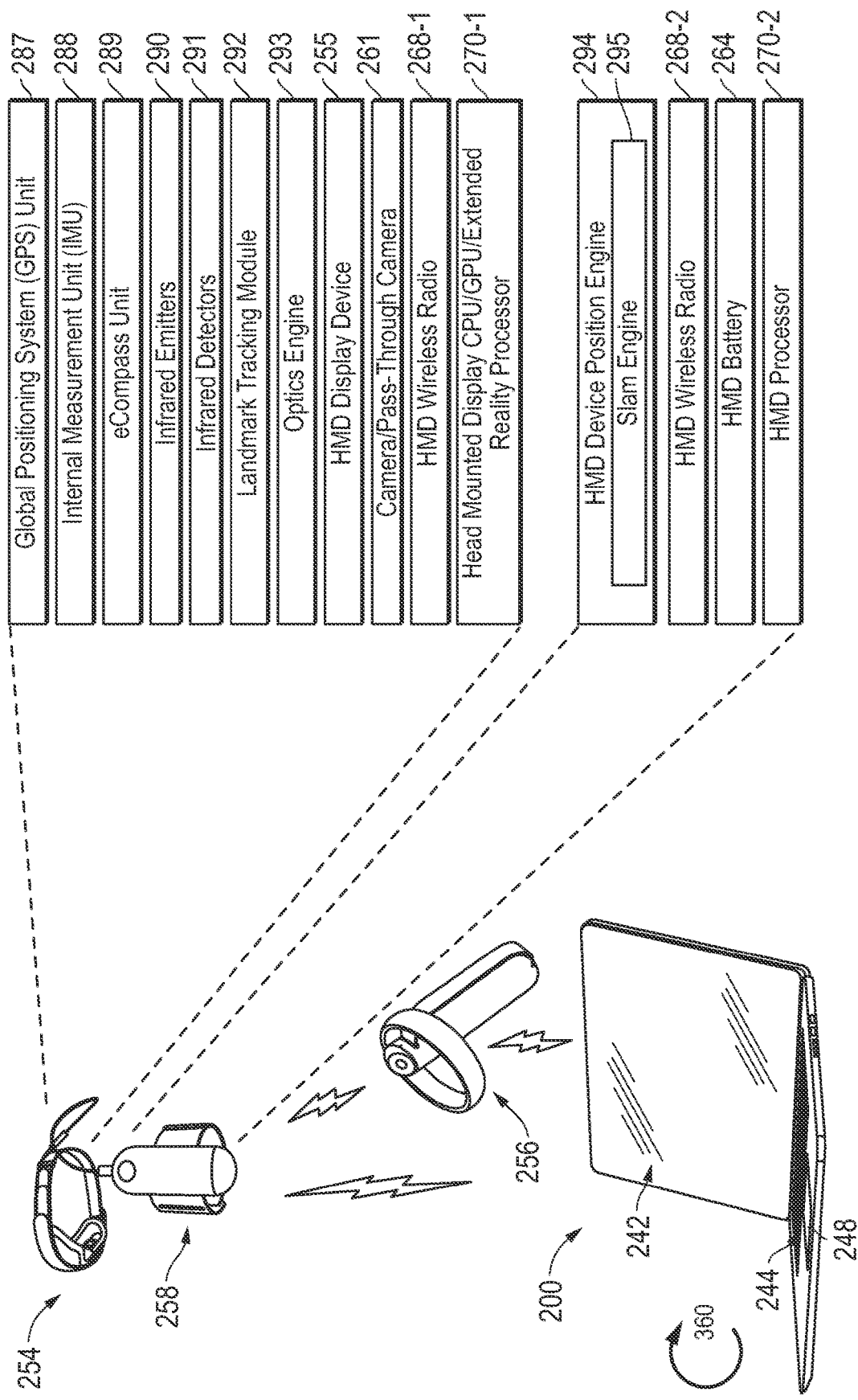
FIG. 2 is a block diagram of an information handling system, HMD device, a compute stick, and an extended reality (XR) handheld controller according to an embodiment of the present disclosure.

FIG. 2 is a block diagram of an information handling system 200, HMD device 254, a compute stick 258, and an extended reality (XR) handheld controller 256 according to an embodiment of the present disclosure. As described herein, the HMD device 254 may be communicatively coupled to the information handling system 200 either via a wired or wireless connection. In an embodiment, the information handling system 200 may be remote to the user operating the HMD device 254 or may be local with the information handling system 200 acting as an intermediary device to a remote information management system on a network as described herein.

As partially depicted, information handling system 200 may be a laptop computer such as a 360-degree convertible system. The information handling system 200 may interface with one or more input/output devices such as a keyboard 244, a mouse (not shown), a video/graphic display 242, a stylus (not shown), a trackpad 248, and XR handheld controller 256, or any combination thereof. These input/output devices may be used to communicate with the HMD device 254 which causes these devices to provide output to the user via, for example, a visual representation on the video/graphic display 242 of what the user sees when operating the HMD device 254. For example, the XR handheld controller 256 may be operatively coupled wirelessly or by wire to the HMD device 254, to the information handling system 200, or both. As described herein, the HMD device 254 may include an HMD wireless radio 268-1. The HMD wireless radio 268-1 or 268-2 (e.g., in the compute stick 258) may be used to operatively coupled the HMD device 254 to the XR handheld controller 256 and/or the information handling system 200. In an embodiment, the HMD device 254 and XR handheld controller 256 may be operatively coupled to one another and, optionally, to the information handling system 200 either via a wired or wireless connection such as Bluetooth, Bluetooth extended, or other protocol as described herein. In an embodiment, the HMD device 254 is operatively coupled to a compute stick 258. The compute stick 258 may also include an HMD wireless radio 268-2 used to operatively coupled the HMD device 254 to a network or to an information handling system 200 as well as provide communication between the XR handheld controller 256 and the HMD device 254. This compute stick 258 may accomplish this by being operatively coupled to the HMD device 254 via a communication line as described herein.

The HMD device 254 may include any number of sensors used to determine the position of the HMD device 254 within an environment by executing, with a processor, the HMD device position engine 294. For example, the HMD device 254 in an embodiment may include positional sensors such as a global positioning system (GPS) unit 287, an inertial measurement unit (IMU) 288, an e-Compass unit 289, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g., GPS unit 287, IMU 288, and/or eCompass unit 289) in an embodiment may operate to measure location coordinates (x, y, z) of the HMD device 254, as well as orientation (0), velocity, and/or acceleration. Velocity, acceleration, and trajectory of the HMD device 254 in such an embodiment may be determined by comparing a plurality of measured location coordinates and orientations taken over a known period of time, or may be measured directly by onboard positional sensor such as an accelerometer. Again, a SLAM process may be executed by a SLAM engine 295, in an embodiment as part of an HMD position engine 294, in order to identify the position of the HMD device 254 with respect to its surrounding environment, model the surrounding environment as viewed from the perspective of the headset wearer, and render the modeled image and virtual elements in a three-dimensional environment matching or relative to the surrounding real-world environment, among other tasks. The SLAM engine 295 and/or HMD position engine 294 may be executed on the HMD device 254, the compute stick 258, or a combination thereof in some embodiments.

In another embodiment, the HMD device 254 may include or interact with other types of positional devices that provide data to the HMD device 254 to determine the location of the HMD device 254 within a physical environment. For example, an Internet-of-Things (IoT) device may include sensors that may be detectable by the HMD device 254 and which provide relative location data to the HMD device 254 that it is within a physical environment. This may include tags, transponders, or other location tags that can be used to triangulate the location of the HMD device 254 within the physical environment. Other sensors such as IR detectors 291 and IR emitters 290 or visible light versions of the same, for example, within either on the HMD device 254 (e.g., inward-out location detection) or located within the physical environment (e.g., outward-in location detection), may be used to triangulate or multilaterate the location of the HMD device 254 within the physical environment.

The HMD device 254 may also be capable of capturing video or still images of its surrounding physical environment, which may include one or more identifiable landmarks. For example, the HMD device 254 may include a camera such as a camera/pass-through camera 261. The camera/pass-through camera 261 may capture a two-dimensional image of the surrounding physical environment, which may be combined with distance measurements gathered by a plurality of IR emitters 290 and IR detectors 291 to generate a three-dimensional image of the surrounding environment as a reference for XR applications. The camera 261 in an embodiment may be, for example, a stereo triangulation or trilateration camera, an Infrared (IR) camera, a sheet of light triangulation camera, a structured light camera, a time-of-flight or time-of-arrival camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image captured by a camera/pass-through camera 261 in an embodiment may be used to determine the position and orientation of the HMD device 254 with respect to the one or more landmarks viewable within the physical environment for reference of motion in an AR, VR, or MR environment presented to a user of the HMD device 254. In an embodiment, the camera/pass-through camera 261 may be used for image recognition of gestures, or used with an XR handheld controller 256 to interact with an XR environment or content therein.

In an embodiment, the XR handheld controller 256 may also include IR detectors 291 and IR emitters 290 or visible light versions of the same, for example, for the HMD device 254 to detect the location of the XR handheld controller 256 relative to the HMD device 254. Again, the IR emitters or IR detectors on the XR handheld controller 256 either on the HMD device 254 (e.g., inward-out location detection) or located on the XR handheld controller 256 (e.g., outward-in location detection of XR handheld controller 256 relative to HMD devices 254), may be used to triangulate or multilaterate the location of the XR handheld controller 256 relative to the HMD devices 254 within the physical environment.

The HMD device 254 in an embodiment may further include an HMD CPU/GPU/XR processor 270-1 or other processor, which may execute instructions to provide images to the user via the HMD video display 255 of the HMD device 254. Such instructions executed by the HMD CPU/GPU/XR processor 270-1 or other processor in an embodiment may include those instructions used to create the VR environment, the AR environment, and/or the MR environment by projecting images to the user whether those images are superimposed over real-world images captured by the camera/pass-through camera 261 or not. These instructions may additionally or alternatively be executed by the HMD processor 270-2 on the compute stick 258 as an additional or alternative processing resource.

The HMD CPU/GPU/XR processor 270-1, HMD processor 270-2 on the compute stick 258, or other processor may also transmit an image of the surrounding environment captured by the camera/pass-through camera 261, the measured position (x, y, z), orientation (0), velocity, and/or acceleration of the HMD device 254 to the wirelessly connected laptop or desktop information handling system 200 via a network adapter and a wireless radio 268-1, 268-2 in an embodiment. The HMD CPU/GPU/XR processor 270-1, HMD processor 270-1 on the compute stick 258, or other processor may also receive SLAM frames indicating the positions of the HMD device 254 and one or more identified landmarks in the surrounding environment from the remotely connected laptop or desktop information handling system 200 via the network adapter.

The HMD CPU/GPU/XR processor 270-1, HMD processor 270-2 on the compute stick 258, or other processor in an such an embodiment may determine the position/orientation of identified landmarks with respect to the HMD device 254 through analysis of the positional information measured in the image captured by the camera/pass-through camera 261 in combination with an identification by a landmark tracking module 292 of the one or more landmarks. In some embodiments, such positional/orientation information may be received at the HMD CPU/GPU/XR processor 270-1, HMD processor 270-2 on the compute stick 258, or other processor from the remotely located laptop or desktop information handling system 200 via a network adapter as described herein.

The HMD device 254 in an embodiment may further include one or more subsystems capable of identifying one or more landmarks within three-dimensional image information as described herein. For example, the HMD device 254 may include a landmark tracking module 292. The landmark tracking module 292 in an embodiment may access the three-dimensional image information of one or more nearby landmarks captured by the HMD device 254. In some embodiments, the landmark tracking module 292 may identify the physical boundaries of one or more potential landmarks within the three-dimensional image captured by the camera/pass-through camera 261. Once the physical boundaries of the landmarks are identified by the landmark tracking module 292 in an embodiment, the distance between these identified items and the HMD device 254 may be determined.

A plurality of IR emitters 290 may be mounted along the exterior of the HMD device 254 in an embodiment. Each IR emitter 290 (e.g., an infrared light emitting diode) in an embodiment may operate to emit infrared (IR) light toward the environment surrounding the HMD device 254. In some embodiments, the light emitted from each IR emitters 290 may be patterned, and each IR emitters 290 may emit the same pattern, or different IR emitters 290 may emit different patterns. The intensity of light emitted from each of the IR emitters 290 in an embodiment may be controlled by the HMD CPU/GPU/XR processor 270-1, a controller (not shown), or an integrated circuit or chip (not shown) executing firmware instructions of the IR emitter 290. Such firmware may also identify the position of each IR emitter 290 along the exterior of the HMD device 254 (e.g., position with respect to field of view of headset).

The HMD device 254 may further include one or more IR detectors 291 capable of detecting infrared light emitted from the plurality of IR emitters 290 reflecting off the surfaces of landmarks or objects within the environment surrounding the HMD device 254. IR detectors 291, in an embodiment, may be composed of IR light emitting detector or detector capable of generating an electrical current based on received or detected infrared light. Electrical currents generated by the plurality of IR detectors 291 in an embodiment may be used to determine a length of time during which light emitted from an IR emitter 290 traveled toward an object in the environment surrounding the HMD device 254, then travelled back toward the IR detector 291 upon reflection. This process is referred to a as time-of-flight detection process. In an embodiment, the IR detectors 291 may be used the XR handheld controller 256 as well to detect the position of the XR handheld controller 256. For example, the XR handheld controller 256 may include one or more IR emitters similar to the IR emitters 290 on the HMD device 254 that can be used by the IR detectors 291 to detect the position of the XR handheld controller 256. The present specification further contemplates the use of visible light detectors or other handheld controller position detectors and HMD device 254 position detectors.

The HMD device 254 may further include one or more subsystems capable of mapping the positions/orientations of the HMD device 254 and one or more identified landmarks within a virtual three-dimensional environment in an embodiment. For example, the HMD device 254 may include a head mounted display (HMD) device position engine 294 that may include, in an embodiment, a simultaneous localization and mapping (SLAM) engine 295. The SLAM engine 295, in an embodiment, may access the position/orientation information for the one or more landmarks with respect to the HMD device 254 generated or received by the HMD CPU/GPU/XR processor 270-1 or HMD processor 270-2 on the compute stick 258, and use this information to generate a three-dimensional virtual map of HMD device 254 and its surrounding environment, including the one or more identified landmarks. In other embodiments, the HMD CPU/GPU/XR processor 270-1 or HMD processor 270-2 on the compute stick 258 may receive one or more SLAM frames including three-dimensional virtual maps of the HMD device 254 and its surrounding environment from the remotely located laptop or desktop information handling system 200 via a network adapter such as an HMD wireless radio 268-1 or 268-2.

In an embodiment, one or more subsystems capable of rendering an image of the surrounding physical environment or an XR image of the same or a new VR environment from the perspective of the HMD device 254 may also be included onboard the HMD device 254. For example, the HMD device 254 may include an optics engine 293, which may access the three-dimensional virtual map generated by the SLAM engine 295 or received from the remotely located information handling system 200 in an embodiment. The optics engine 293 in an embodiment may render a three-dimensional image of the surrounding environment including the identified one or more landmarks based on the location/orientation of the landmarks with respect to the HMD device 254 within the virtual map, as with a VR environment. In other embodiments, the optics engine 293 may render a three-dimensional image of an object projected to appear as if it is incorporated within the environment surrounding the HMD device 254, as with an AR environment or even a MR environment.

The HMD device 254 in an embodiment may further include one or more subsystems capable of and displaying the rendered image of the surrounding physical environment or a virtual XR environment with positions relative to a physical surrounding within the HMD device 254. For example, the HMD device 254 may include an HMD video display 255, capable of displaying the image (e.g., VR image, AR image, or MR image) rendered by the optics engine 293.

In an embodiment, the HMD device 254 may include an HMD compute stick 258. The HMD compute stick 258 may be used to remove some of the hardware typically located within a housing of the HMD device 254 to an offsite location. The HMD compute stick 258 may be operatively coupled to the HMD device 254 via a wired connection and may include, in an example embodiment, a separate body-mounting device to secure the HMD compute stick 258 to another portion of the user's body such as an arm. In an embodiment, the HMD compute stick 258 may include any type of hardware typically associated with the HMD device 254 such as the HMD processor 270-2, the HMD wireless radio 268-2, a data storage device, a power source such as an HMD battery 264, among other hardware. The HMD processor 270-2 may execute code instructions of any system independently or in combination with the HMD CPU/GPU/XR processor 270-1 of the HMD device 254 in various embodiments. This may include the HMD device position engine 294, the SLAM engine 295, and the optics engine 293, among others in various embodiments.

In an embodiment, the HMD device 254 may be operatively coupled to one or more XR handheld controllers 256. These XR handheld controllers 256 may allow a user of the HMD device 254 to interact with virtual objects displayed to the user in the XR surrounding environment such as grab virtual objects or move virtual objects. As described herein, the HMD device 254 may present to the user a VR environment, an MR environment, or an AR environment. The VR environment includes a complete virtual image presented to the user via the HMD video display 255 and may provide no real-world images (e.g., images of the physical environment around the HMD device 354) to the user concurrently via, for example, images obtained by a camera/pass-through camera 261 on the HMD device 254. The AR environment may include images of objects that are overlayed onto real world images presented to the user via the HMD video display 255 of the HMD device 254. The AR environment includes, in an embodiment, computer-generated perceptual information enhancing those real-world images (e.g., images of the physical environment around the HMD device 254) presented to the user via the HMD video display 255 of the HMD device 254. In an embodiment, this computer-generated perceptual information may include multiple sensory modalities such as visual, auditory, haptic, somatosensory and even olfactory modalities. The AR environment may, therefore, include a projection of real-world environment images (e.g., presented at the HMD video display 255 of the HMD device 254) with information or objects added virtually as an overlay. MR environments may include a merging of real-world images (e.g., images of the physical environment around the HMD device 254) captured by the camera/pass-through camera 261 and virtual, computer-generated images that are presented to the user. In an embodiment, unlike in AR, the user interacting in an MR environment may interact with the digital-objects presented to the user. The XR handheld controller 256 may include one or more input buttons that allow the user to perform various functions while viewing an XR environment such as a joystick, a trigger, and push buttons among other input devices. In an embodiment, the XR handheld controller 256 may communicate wirelessly with the HMD device 254 using, for example, a Bluetooth connection or some other wireless protocol as described herein.

Figure 3:
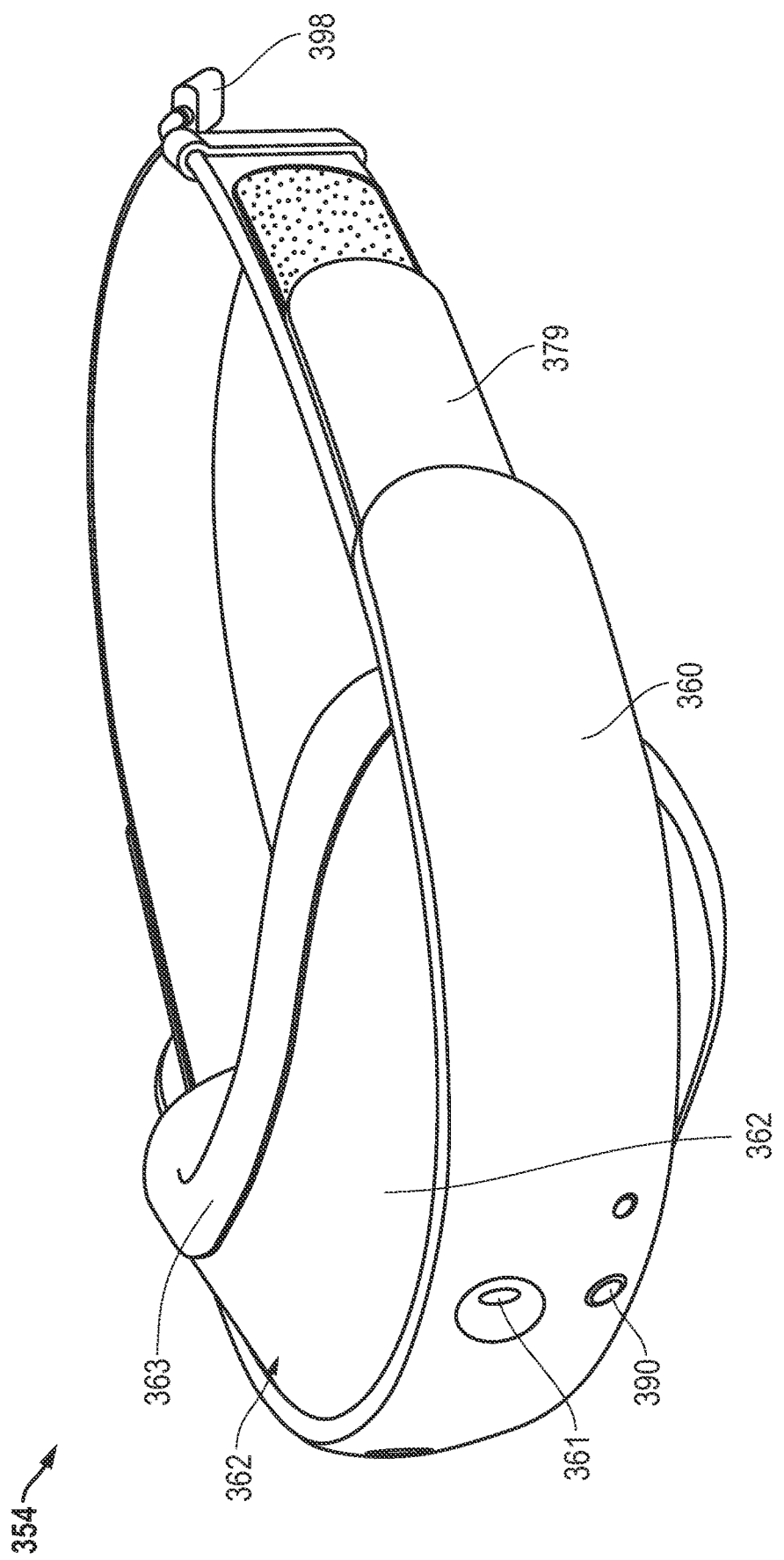
FIG. 3 is a graphic diagram perspective view of an HMD device according to an embodiment of the present disclosure.

FIG. 3 is a graphic diagram perspective view of an HMD device 354 according to an embodiment of the present disclosure. The general shape and form of the HMD device 354, in an embodiment, may be similar to a pair of wrap-around goggles. In an embodiment, the HMD device 354 may be as lightweight as possible in order to place the least amount of weight on the user's face and head during use. As such, the HMD device 354 may include an HMD connection wire 398 used to operatively couple the HMD device 354 to an off-site processing and storage resource such as a wearable compute stick or head strap mounted compartment (not shown) in some embodiments. In another embodiment, this processing and storage resource may be an information handling system similar to the information handling system described in connection with FIG. 1. In an embodiment, this processing and data storage resource may be a compute stick that includes the hardware such as a processor, GPU/video processor, a data storage device, a power management unit, a power source (e.g., a battery) among other hardware that may be operatively coupled to the HMD device 354 but could be placed offsite from the HMD device 354 in order to reduce the weight of the HMD device 354 on the user's head. This compute stick, in an embodiment, may include a strap or other securing device that allows the user to secure the compute stick to the user's body (e.g., an arm) when operating the HMD device 354. In an embodiment, this offsite compute stick may be operatively coupled to the HMD video display (e.g., 176, FIG. 1, not shown in FIG. 2) of the HMD device 354 in order to provide video/image data to the user during use.

The HMD device 354 may include an HMD shield 360 in an embodiment. The HMD shield 360 may act as part of the housing on to which other components of the HMD device 354 may be secured or into which some of the hardware of the HMD device 354 may be placed. For example, the HMD device 354 may include one or more cameras/pass-through cameras 361 used to provide data to a processing resource describing the location of the HMD device 354 within a physical environment. Additionally, the camera/pass-through camera 361 may provide images to the user via the HMD video display of the physical environment around the user. The camera/pass-through camera 361 may be formed into a front or a side portion of the HMD shield 360 and is protected from damage by the rigid housing of the HMD shield 360.

The HMD shield 360 may also house an IR detector/IR emitter 390. In an embodiment, the IR detector/IR emitter 390 or visible light versions of the same, for example, within either on the HMD device 354 (e.g., inward-out location detection) or located within the physical environment (e.g., outward-in location detection), may be used to triangulate or multilaterate the location of the HMD device 354 within the physical environment. In the example embodiment shown in FIG. 3, the IR detector/IR emitter 390 may also be placed within the housing of the HMD shield 360 to protect the IR detector/IR emitter 390 from damage. Again, the data obtained from the IR detector/IR emitter 390 may be used by a SLAM engine executed by the processing resources described herein.

The HMD shield 360 may also include an HMD hood 362 operatively coupled to the HMD shield 360. Again, because the area between the user's eyes and the HMD video display needs to be dark, the HMD hood 362 may prevent light from entering this area. In an embodiment, the HMD hood 362 may be nearly lightproof so that the user may view the images and videos presented to the user at the HMD video display. In an embodiment, the HMD hood 362 may include a frame (not shown) that maintains a shape of the HMD hood 362 around the user's eyes and away from the HMD video display. In an embodiment, the frame and HMD hood 362 may include a face mask 363 used to abut a user's face when the HMD device 354 is worn. The face mask 363 may be made of a pliable material such as a foam, synthetic rubber, or silicone in order to soften the interface between the HMD device 354 and the user's face making the wearing of the HMD device 354 more comfortable to the user.

The HMD device 354 may further include a head strap 379. In an embodiment, the head strap 379 may be operatively coupled to the HMD shield 360 and extend away from the HMD shield 360. The head strap 379 may be sized to fit around the back a user's head and is used to secure the HMD device 354 to the user's head and face. In an embodiment, the head strap 379 may include adjustable straps that allow the user to loosen or tighten the head strap 379 around the user's head. In an embodiment, the head strap 379 may be made of an elastic material that may stretch around the user's head when the HMD device 354 is being worn. In an embodiment, the head strap 379 may include a Velcro coupling device or a belt structure to allow the user to adjust the length of the head strap 379 for a customized fit.

The head strap 379, in an embodiment, may be secured to the HMD shield 360 via a shield hinge (not shown) to allow the head strap to be worn at a variety of angles as selected by a user for comfort and fit. The shield hinge may be allowed to rotate within the HMD shield 360 and include a loop or other coupling device used to secure the head strap 379 to the shield hinge. In an embodiment, the head strap 379 may be removed from the HMD shield 360 when the head strap 379 is uncoupled from itself and passed through the loop or other coupling device of the shield hinge.

Figure 4:
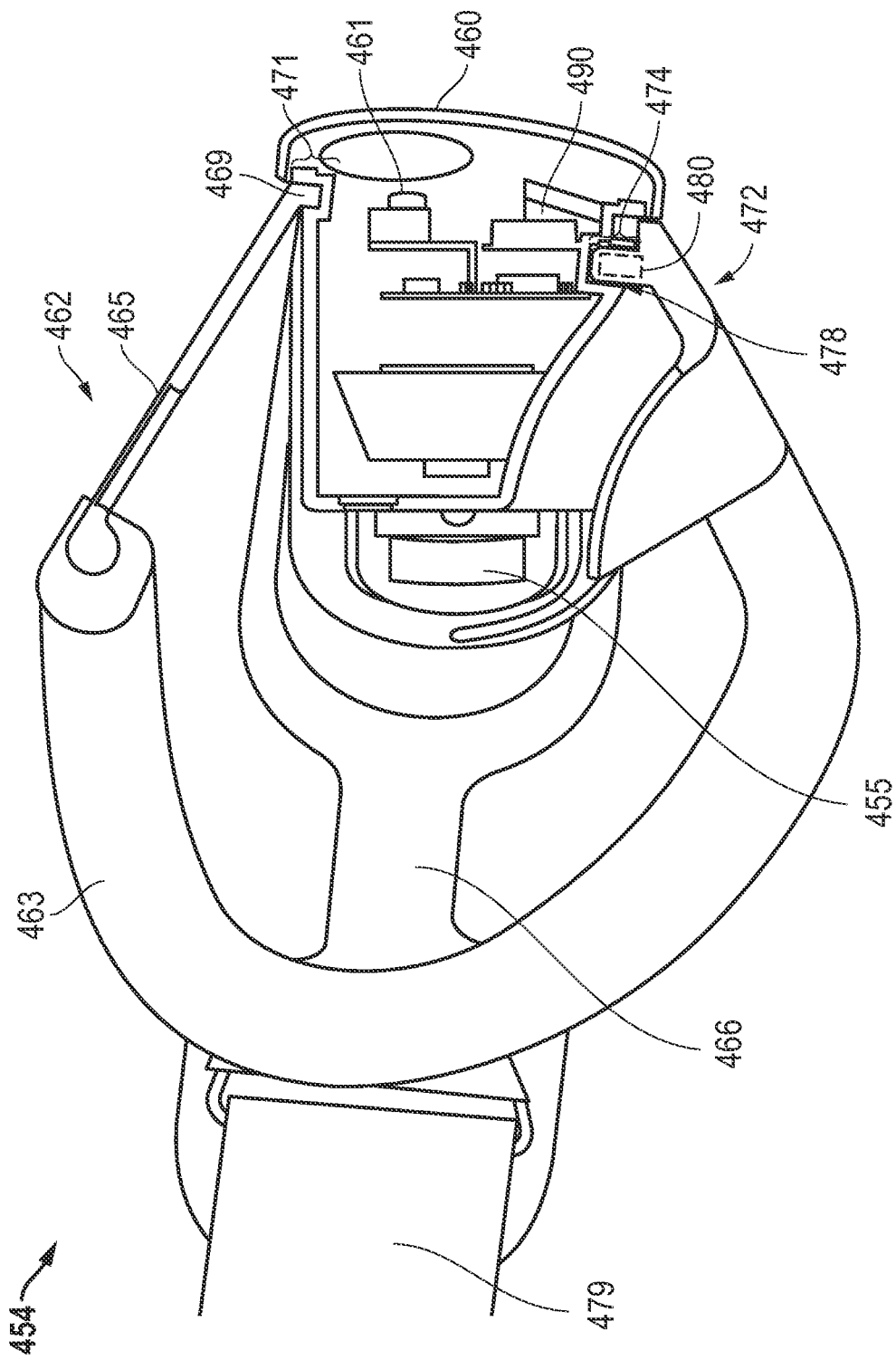
FIG. 4 is a graphic diagram side, sectional view of an HMD device and with a swappable nose bridge according to an embodiment of the present disclosure.

FIG. 4 is a side, sectional view illustrating an HMD device 454 and with a swappable nose bridge 472 according to an embodiment of the present disclosure. This side, sectional view shows an interior portion of the HMD device 454. As described herein, the HMD device 454 may include an HMD hood 462 operatively coupled to the HMD shield 460. Again, because the area between the user's eyes and the HMD video display 455 needs to be dark, the HMD hood 462 may prevent light from entering this area. In an embodiment, the HMD hood 462 may be nearly lightproof so that the user may view the images and videos presented to the user at the HMD video display 455. In an embodiment, the HMD hood 462 may include a shroud frame 466 that maintains a shape of the fabric shroud 465 of the HMD hood 462 around the user's eyes and away from the HMD video display 455. In an embodiment, the shroud frame 466 and HMD hood 462 may include a face mask 463 used to abut a user's face when the HMD device 454 is worn. The face mask 463 may be made of a pliable material such as a foam in order to soften the interface between the HMD device 454 and the user's face making the wearing of the HMD device 454 more comfortable to the user.

The HMD device 454 may further include a head strap 479. In an embodiment, the head strap 479 may be operatively coupled to the HMD shield 460 via a shield hinge (not shown) and extend away from the HMD shield 460. The head strap 479 may be sized to fit around the back a user's head and is used to secure the HMD device 454 to the user's head and face. In an embodiment, the head strap 479 may include adjustable straps that allow the user to loosen or tighten the head strap 479 around the user's head. In an embodiment, the head strap 479 may be made of an elastic material that may stretch around the user's head when the HMD device 454 is being worn.

The HMD device 454 may include an HMD shield 460 in an embodiment. The HMD shield 460 may act as part of the housing on to which other components of the HMD device 454 may be secured or into which some of the hardware of the HMD device 454 such as the HMD video display 455, HMD processing resource, memory, or other components may be placed. For example, the HMD device 454 may include a camera/pass-through camera 461 used to provide data to a processing resource describing the location of the HMD device 454 within a physical environment. Additionally, the camera/pass-through camera 461 may provide images to the user via the HMD video display 455 of the physical environment around the user. The camera/pass-through camera 461 may be formed into a front portion of the HMD shield 460 and protected from the rigid housing of the HMD shield 460 from damage.

The HMD shield 460 may also house an IR emitter/detector 490. In an embodiment, the IR emitters/detectors 490 or visible light versions of the same, for example, within either on the HMD device 454 (e.g., inward-out location detection) or located within the physical environment (e.g., outward-in location detection), may be used to triangulate or multilaterate the location of the HMD device 454 within the physical environment. In the example embodiment shown in FIG. 4, the IR emitters/detectors 490 may also be placed within the housing of the HMD shield 460 to protect the IR emitters/detectors 490 from damage. Again, the data obtained from the IR emitters/detectors 490 may be used by a SLAM engine executed by the processing resources described herein. The SLAM engine, in an embodiment, may access the position/orientation information for the one or more landmarks with respect to the HMD device 454 generated or received by the HMD CPU/GPU/XR processor, the data from the IR emitters/detectors 490, and other orientation data described herein, and use this information to generate a three-dimensional virtual map of HMD device 454 and its surrounding environment, including the one or more identified landmarks. In other example embodiments, the HMD CPU/GPU/XR processor may receive one or more SLAM frames including three-dimensional virtual maps of the HMD device 454 and its surrounding environment from the remotely located laptop or desktop information handling system via a network adapter.

As described herein, the HMD device 454 includes a swappable nose bridge 472. In order to also make the user more comfortable, the HMD device 454 may include this swappable nose bridge 472. The swappable nose bridge 472 may be a removable part of the HMD housing such as the HMD shield 460 that contacts the user's nose when the HMD device 454 is placed on the user's head. In an embodiment, the swappable nose bridge 472 may be one of a plurality of swappable nose bridges 472 available to the user to operatively couple to the HMD shield 460. These plurality of swappable nose bridges 472 may be of different sizes or colors to accommodate the user or a plurality of user's when interfacing with the HMD device 454. For example, a first user may have a relatively smaller nose than a second user and the plurality of swappable nose bridges 472 may be differentiated by different sizes to accommodate these differences is physiology between, in this example, the first user and the second user. In an embodiment, the plurality of swappable nose bridges 472 may be of different colors or may include other differentiating features (e.g., symbols) that allow a user to know which of the plurality of swappable nose bridges 472 belongs to or is to be used by that user. Using the HMD device 454 may cause different bacteria or viruses to be transmitted from one user to another. In order to mitigate this, each user may use their own swappable nose bridge 472 that is differentiated by color, for example, in order to the user to readily swap in their assigned or owned swappable nose bridge 472 to use with the HMD device 454.

As described herein, the swappable nose bridge 472 may be operatively coupled into a bottom side of the HMD shield 460. As described herein, the HMD shield 460 of the HMD device 454 may include a nose bridge slot 478. This nose bridge slot 478 may receive a nose bridge extension 474 of the swappable nose bridge 472. The nose bridge extension 474 may be sized to fit within the nose bridge slot 478 easily so that the user may exchange one of a plurality of swappable nose bridges 472 with another where, for example, the first user needs to have a swappable nose bridge 472 that is owned by the user or sized to fit the user as described herein. In an embodiment, the nose bridge extension 474 may be sized to create an interference fit within the nose bridge slot 478. The level of interference fit may be such that the swappable nose bridge 472 is not easily separatable from the HMD shield 460 except by the user applying force to remove the nose bridge extension 474 from within the nose bridge slot 478.

In an embodiment, the nose bridge extension 474 may include a nose bridge magnet placed at a nose bridge magnet location 480. The nose bridge magnet at the nose bridge magnet location 480 may interface with a metal portion within the nose bridge slot 478 such as a ferromagnetic metal keep. In an embodiment, the ferromagnetic metal keep may be made of a ferromagnetic material that magnetically interacts with the nose bridge magnet at the nose bridge magnet location 480 to help secure the nose bridge extension 474 within the nose bridge slot 478 and, accordingly, the swappable nose bridge 472 to the HMD shield 460. In an embodiment, the nose bridge magnet at the nose bridge magnet location 480 may be embedded within the nose bridge extension 474. In this embodiment, the material of the swappable nose bridge 472 may conceal the presence of the nose bridge magnet. In an embodiment, the swappable nose bridge 472 may be manufacture by placing the nose bridge magnet within a mold and the material forming the swappable nose bridge 472 may be injection molded into the mold to secure the nose bridge magnet at the nose bridge magnet location 480 within the nose bridge extension 474. In an embodiment, the material forming the swappable nose bridge 472 may be a pliable plastic, silicone, rubber, or synthetic rubber that is capable of being injection molded into a mold, for example. In the case where rubber or synthetic rubber is used, the surface of the rubber, silicone, or synthetic rubber may increase the friction between the surfaces of the swappable nose bridge 472 and the user's nose. This may increase the ability of the swappable nose bridge 472 and the HMD device 454 to be retained on the user's face and not move on the user's face while in use.

Figure 5:
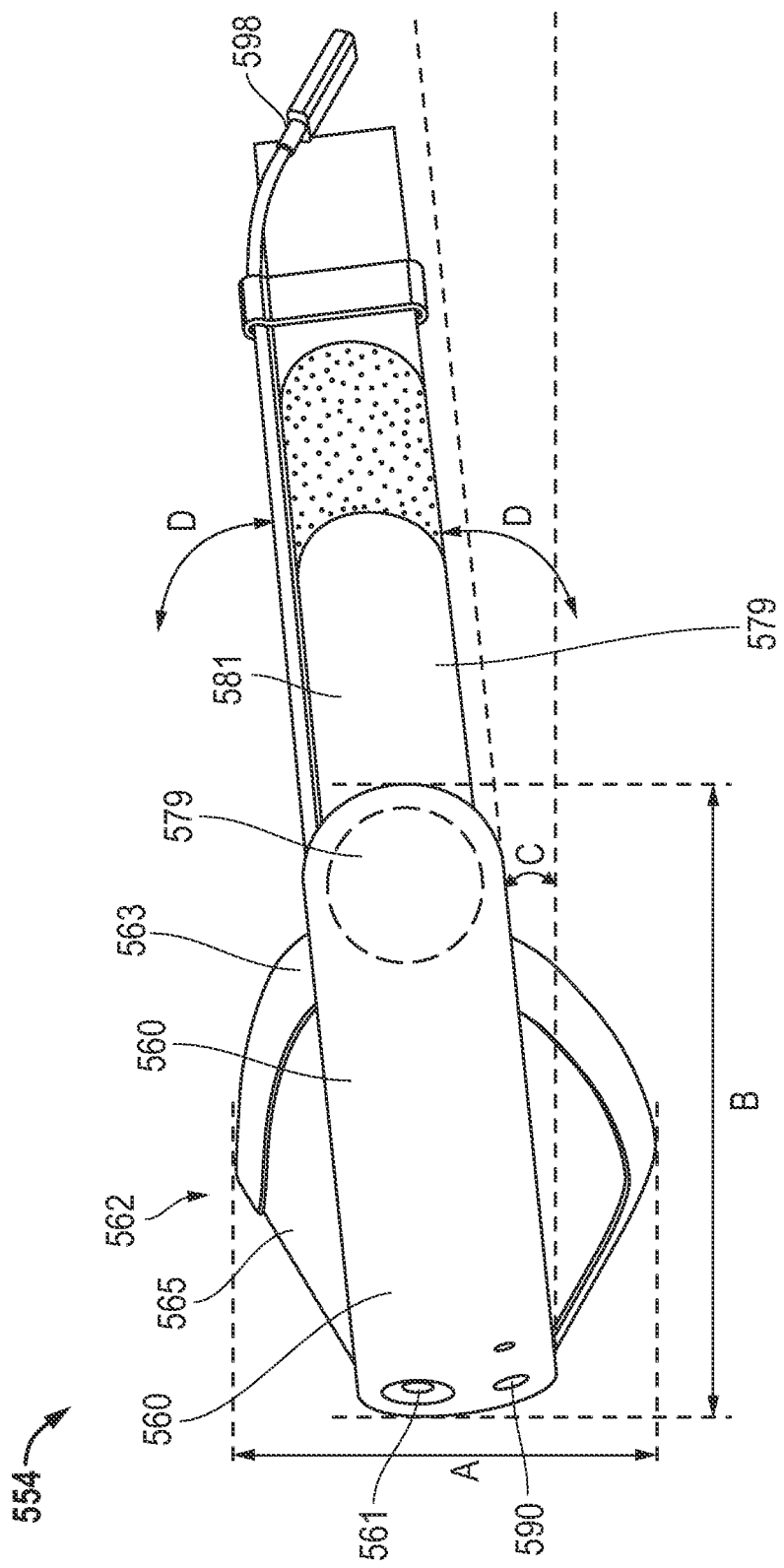
FIG. 5 is a graphic diagram side view of an HMD device according to another embodiment of the present disclosure.

FIG. 5 is a graphic diagram side view of an HMD device 554 according to another embodiment of the present disclosure. As described herein, the HMD device 554 may include an HMD shield 560 that forms part of the housing of the HMD device 554 to house the IR emitters/detectors 590 and camera/pass-through camera 561, HMD video displays, processing resources, in some embodiments, as well as other circuitry and hardware (e.g., printed circuit boards (PCB)). The HMD shield 560 may be made of a lightweight material such as plastic in order to further reduce the weight of the HMD device 554 thereby making the wearing of the HMD device 554 more comfortable for the user. The HMD device 554 may include an HMD connection wire 598 used to operatively couple the HMD device 554 to a processing and storage resource and power systems/battery such as located at a wearable compute stick (not shown) in some embodiments.

The HMD hood 562 may be made of a fabric shroud 565 laid over and secured to a shroud frame (not shown). The shroud frame may be a lightweight piece of pliable and bendable plastic that is skeletonized and includes one or more supporting members for the fabric shroud 565 to be draped over the shroud frame. This reduces the amount of materials used to form the HMD hood 562 as well as reduce the amount of weight of the HMD hood 562 and, accordingly, the HMD device 554. The fabric shroud 565 may be made of any material that prevents light from entering through the HMD hood 562 and into the user-viewing area within the HMD device 554 such as that area between the user's eyes and the HMD video display (not shown) when the HMD device 554 is being worn. In an embodiment, the fabric shroud 565 any number of fabric layers, for example includes three layers of fabric. A first fabric shroud layer may include directionally-oriented moisture wicking fibers. The first fabric shroud layer includes directionally-oriented moisture wicking fibers that traps microscopic droplets of sweat and other fluids and wicking them out of and away from the user-viewing area. The directionally-orientated moisture wicking fibers may be arranged to wick the moisture to a less dense portion of the first fabric shroud layer that is away from the user-viewing area. This first fabric shroud layer may, therefore, prevent condensation from building up inside the HMD hood 562, prevent fogging of the HMD video display 562, and prevent an uncomfortable physical environment for the user.

The fabric shroud 565 may further include, in an embodiment, a second layer and a third layer each used to prevent light from entering the HMD hood 562 and into the user-viewing area. The second layer may include fibers that are woven in a first direction while the third layer includes fibers woven in a second direction that is different from the first direction. In an embodiment, the direction of the woven fibers of the second layer and the third layer may be perpendicular to each other so that light may not pass through the HMD hood 562. The weave and the material of the second layer and third layer may be sufficient to allow the moisture wicked away from inside the HMD hood 562 by the first fabric shroud layer to pass through the second layer and third layer.

Still further, the HMD hood 562 includes a face mask 563 operatively coupled to the shroud frame. The face mask 563 may be made of a pliable material such as a foam or silicone in order to soften the interface between the HMD device 554 and the user's face making the wearing of the HMD device 554 more comfortable to the user. In an embodiment, the shroud frame may include a frame bead formed along a proximal edge of the shroud frame. The frame bead may interface with a bead channel formed along a length of the face mask 563 that allows the face mask 563 to be wrapped around the frame bead securing the face mask 563 to the HMD hood 562. In an embodiment, the shroud frame may also be made of a pliable plastic that bends to conform to a user's face when the HMD device is worn by the user.

FIG. 5 also shows a head strap 581 operatively coupled to the HMD shield 560. The head strap 581 may be coupled to the HMD shield 560 via a shield hinge at a shield hinge location 579 that allows the head strap 581 to hinge about the shield hinge as indicated by curved arrows "D." This hinging about the shield hinge at a shield hinge location 579 allows the user to position a back end of the head strap 581 at any angled position along the back of the user's head. This is done so a user may select a head strap angle for comfort or fit. This may also allow for the HMD device 554 to be used by multiple different people regardless of the shapes of those users' heads.

In an embodiment, the HMD shield 560 and head strap 581 may be arranged at an adjustable angle relative to a horizontal plane as indicated by angle "C". This adjustable angle of the HMD shield 560 and head strap 581 in FIG. 5 relative to the horizontal plane allows the head strap 581 to be arranged to not interfere with a user's ears. This may prevent the head strap 581 from crossing over the user's ears and preventing a user from using, for example, headphones during the operation of the HMD device 554. Additionally, the adjustable angle of the HMD shield 560 and head strap 581 in FIG. 5 relative to the horizontal plane angles the camera/pass-through camera 561 downward at an angle that may create a better view of the user's hands by the camera/pass-through camera 561. In an embodiment, the adjustable angle "C" is between 5 and 15 degrees. In an embodiment, the angle "C" at 10 degrees+/−2 degrees may be optimal for comfort and fit.

FIG. 5 further shows a height of the HMD device 554 at line "A" and a length of the HMD shield 560 at line "B" and may be any dimension. In an example embodiment, the height of the HMD device 554 (e.g., "A") may be between 60 and 100 mm. In a particular example embodiment, the height of the HMD device 554 (e.g., "A") may be 80 mm. In an example embodiment, the length of the HMD shield 560 of the HMD device 554 (e.g., "B") may be between 100 and 150 mm. In a particular example embodiment, the length of the HMD shield 560 of the HMD device 554 (e.g., "B") may be 119 mm. A width of the HMD shield 560 may be between 160 mm and 200 mm in an example embodiment. A width of the HMD shield 560 may be 188 mm in a particular example embodiment. These measurements may vary to fit the head size of a user or to meet an average head size of a group of users and may vary based on designs of HMD shield 560 and other components of the HMD device 554.

Figure 6:
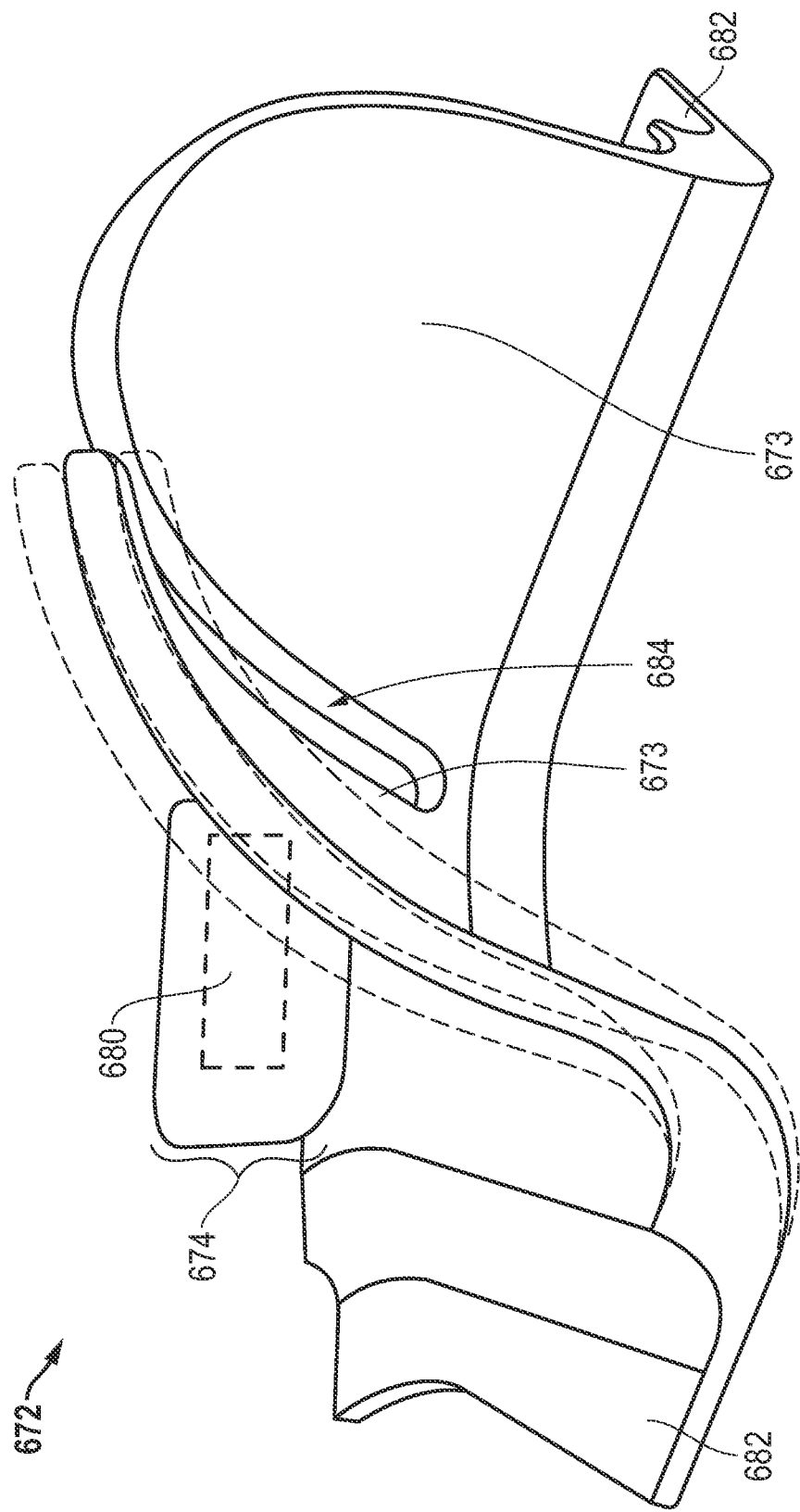
FIG. 6 is a graphic diagram perspective view of a swappable nose bridge of an XR HMD device according to an embodiment of the present disclosure.

FIG. 6 is a graphic diagram perspective view of a swappable nose bridge 672 of an XR HMD device according to an embodiment of the present disclosure. In order to also make the user more comfortable, the HMD device may include this swappable nose bridge 672. The swappable nose bridge 672 may be a removable part of the HMD housing such as the HMD shield that contacts the user's nose when the HMD device is placed on the user's head. In an embodiment, the swappable nose bridge 672 may be one of a plurality of swappable nose bridges 672 available to the user to operatively couple to the HMD shield. These plurality of swappable nose bridges 672 may be of different sizes or colors to accommodate the user or a plurality of user's when interfacing with the HMD device. For example, a first user may have a relatively smaller nose than a second user and the plurality of swappable nose bridges 672 may be differentiated by different sizes to accommodate these differences is physiology between, in this example, the first user and the second user. In an embodiment, the plurality of swappable nose bridges 672 may be of different colors or may include other differentiating features (e.g., symbols) that allow a user to know which of the plurality of swappable nose bridges 672 belongs to that user. Using the HMD device may cause different bacteria or viruses to be transmitted from one user to another. In order to mitigate this, each user may use their own swappable nose bridge 672 that is differentiated by color, for example, in order to the user to readily swap in their assigned or owned swappable nose bridge 672 to use with the HMD device.

As described herein, the swappable nose bridge 672 may be operatively coupled into a bottom side of the HMD shield. As described herein, the HMD shield of the HMD device may include a nose bridge slot. This nose bridge slot may receive a nose bridge extension 674 of the swappable nose bridge 672. The nose bridge extension 674 may be sized to fit within the nose bridge slot easily so that the user may exchange one of a plurality of swappable nose bridges 672 with another where, for example, the first user needs to have a swappable nose bridge 672 that is owned by the user or sized to fit the user as described herein. In an embodiment, the nose bridge extension 674 may be sized to create an interference fit within the nose bridge slot. The level of interference fit may be such that the swappable nose bridge 672 is not easily separatable from the HMD shroud except by the user applying force to remove the nose bridge extension 674 from within the nose bridge slot.

In an embodiment, the nose bridge extension 674 may include a nose bridge magnet placed at a nose bridge magnet location 680. The nose bridge magnet at the nose bridge magnet location 680 may interface with a metal portion within the nose bridge slot such as a ferromagnetic metal keep or a magnet of opposite polarity within the nose bridge slot. In an embodiment, the ferromagnetic metal keep may be made of a ferromagnetic material that magnetically interacts with the nose bridge magnet at the nose bridge magnet location 680 to help secure the nose bridge extension 674 within the nose bridge slot and, accordingly, the swappable nose bridge 672 to the HMD shield. In an embodiment, the nose bridge magnet at the nose bridge magnet location 680 may be embedded within the nose bridge extension 674. In this embodiment, the material of the swappable nose bridge 672 may conceal the presence of the nose bridge magnet. In an embodiment, the swappable nose bridge 672 may be manufacture by placing the nose bridge magnet within a mold and the material forming the swappable nose bridge 672 may be injection molded into the mold to secure the nose bridge magnet at the nose bridge magnet location 680 within the nose bridge extension 674. In an embodiment, the material forming the swappable nose bridge 672 may be a pliable plastic, rubber, or synthetic rubber that is capable of being injection molded into a mold, for example. In the case where rubber or synthetic rubber is used, the surface of the rubber or synthetic rubber may increase the friction between the surfaces of the swappable nose bridge 672 and the user's nose. This may increase the ability of the swappable nose bridge 672 and the HMD device to be retained on the user's face and not move on the user's face while in use.

In an embodiment, the swappable nose bridge 672 may include a nose bridge collar 682. The nose bridge collar 682 may be a portion of the swappable nose bridge 672 that conforms to an outside surface of the HMD shield, the HMD frame, and the face mask. The nose bridge collar 682 may conform to the outside surface of the HMD shield in order to prevent light from entering the area between the HMD video display and the user's eyes thereby creating a nearly lightproof environment. By providing this nearly lightproof environment via the nose bridge collar, the user may better see the images and video presented to the user via the HMD video display. In an embodiment, the nose bridge collar 682 may be formed within the mold used to form the swappable nose bridge 672 as described herein. In an embodiment, the nose bridge collar 682 may abut any portion of the HMD device including a face mask that abuts the user's face when the HMD device is being worn.

In an embodiment, the swappable nose bridge 672 may include a nose bridge slit 684 formed through a portion of the swappable nose bridge 672. The nose bridge slit 684 may be formed along a portion of the swappable nose bridge 672 where a ridge of the user's nose may contact the swappable nose bridge 672. The nose bridge slit 684 may, in an embodiment, create two nose bridge flaps 673 that separate the portion of the swappable nose bridge 672 that contacts the user's nose when the HMD device is being worn. In an embodiment, the nose bridge flaps 673 formed by the nose bridge slit 684 may include a shape memory alloy structure embedded in the nose bridge flaps 673 to allow a portion of the swappable nose bridge 672 contacting the user's nose to be elastically deformed to conform to a shape of the user's nose. In FIG. 6, the nose bridge flaps 673 may, therefore, be allowed to move up and down as indicated by the dashed lines. The shape memory alloy structure may be a sheet, rod, or wire of, for example, metal alloys that includes one or more of copper, aluminum, cadmium, nickel, gallium, gold, iron, silicon, beryllium, palladium, zinc, platinum, niobium, hafnium, manganese, cobalt, tin, among other metals and non-metals in different proportions. In an embodiment, a the shape memory alloy structure may be embedded into the nose bridge flaps 673 created by the nose bridge slit. In an embodiment, the shape memory alloy structure may be embedded into the nose bridge flaps 673 using the injection molding process described herein. In an embodiment, the injection molding process may include inserting the sheet or sheets of shape memory alloy structure into a mold and injecting a pliable plastic, rubber, or synthetic rubber into the mold and secure the shape memory alloy structure into the nose bridge flaps 673. In an embodiment, this injection molding process may be completed concurrently with the injection molding process used to secure the nose bridge magnet at the nose bridge magnet location 680 within the nose bridge extension 674 as described herein. The shape memory alloy structure formed into the nose bridge flaps 673 allows the portions of the swappable nose bridge 672 that touches the user's nose to be elastically deflected (as indicated by dashed lines) into a position to conform to the surface of the user's nose. This increases the comfortability of the swappable nose bridge 672 as the HMD device is placed on the user's head.

Figure 7:
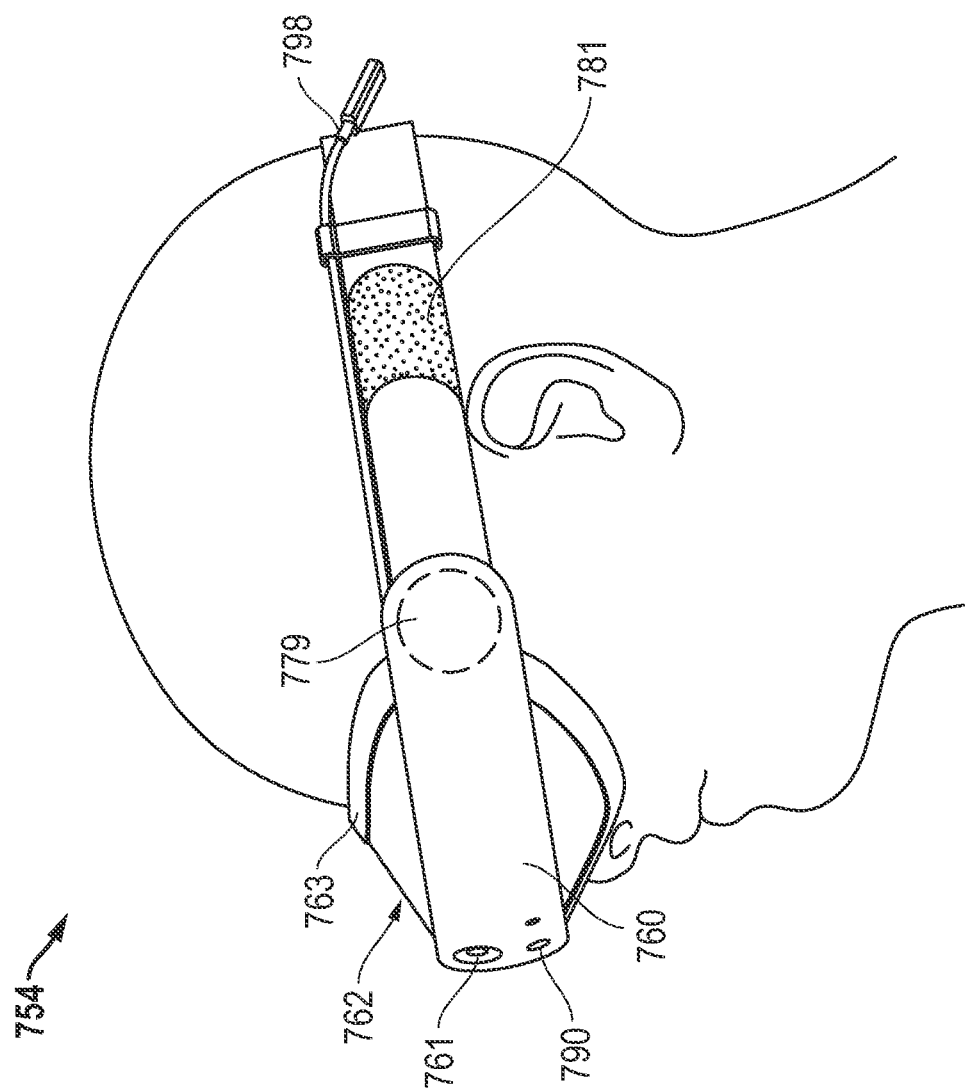
FIG. 7 is a graphic diagram side view of a user wearing an HMD device according to an embodiment of the present disclosure.

FIG. 7 is a graphic diagram side view of a user wearing an HMD device according to an embodiment of the present disclosure. As described herein, the HMD device 754 may include an HMD shield 760 that forms part of the housing of the HMD device 754 to house the IR emitters/detectors 790 and camera/pass-through camera 761 as well as other circuitry and hardware (e.g., printed circuit boards (PCB)). The HMD shield 760 may be made of a lightweight material such as plastic in order to further reduce the weight of the HMD device 754 thereby making the wearing of the HMD device 754 more comfortable for the user. The HMD device 754 may include an HMD connection wire 798 used to operatively couple the HMD device 754 to a processing and storage resource such as a wearable compute stick (not shown) in some embodiments.

The HMD hood 762 may be made of a fabric shroud 765 laid over and secured to a shroud frame (not shown). The shroud frame may be a lightweight piece of pliable and bendable plastic that is skeletonized and includes one or more supporting members for the fabric shroud 765 to be draped over the shroud frame. This reduces the amount of materials used to form the HMD hood 762 as well as reduce the amount of weight of the HMD hood 762 and, accordingly, the HMD device 754. The fabric shroud 765 may be made of any material that prevents light from entering through the HMD hood 762 and into the user-viewing area within the HMD device 754 such as that area between the user's eyes and the HMD video display (not shown) when the HMD device 754 is being worn. In an embodiment, the fabric shroud 765 includes three layers of fabric. A first fabric shroud layer may include directionally-oriented moisture wicking fibers. The first fabric shroud layer includes directionally-oriented moisture wicking fibers that traps microscopic droplets of sweat and other fluids and wicking them out of and away from the user-viewing area. The directionally-orientated moisture wicking fibers may be arranged to wick the moisture to a less dense portion of the first fabric shroud layer that is away from the user-viewing area. This first fabric shroud layer may, therefore, prevent condensation from building up inside the HMD hood 762, prevent fogging of the HMD video display 762, and prevent an uncomfortable physical environment for the user.

The fabric shroud 765 may further include, in an embodiment, a second layer and a third layer each used to prevent light from entering the HMD hood 762 and into the user-viewing area. The second layer may include fibers that are woven in a first direction while the third layer includes fibers woven in a second direction that is different from the first direction. In an embodiment, the direction of the woven fibers of the second layer and the third layer may be perpendicular to each other so that light is prevented from passing through the HMD hood 762. The weave of the second layer and third layer may be sufficient to allow the moisture wicked away from inside the HMD hood 762 by the first fabric shroud layer to pass through the second layer and third layer.

Still further, the HMD hood 762 includes a face mask 763 operatively coupled to the shroud frame. The face mask 763 may be made of a pliable material such as a foam or silicone in order to soften the interface between the HMD device 754 and the user's face making the wearing of the HMD device 754 more comfortable to the user. In an embodiment, the shroud frame may include a frame bead formed along a proximal edge of the shroud frame. The frame bead may interface with a bead channel formed along a length of the face mask 763 that allows the face mask 763 to be wrapped around the frame bead securing the face mask 763 to the HMD hood 762. In an embodiment, the shroud frame may also be made of a pliable plastic that bends to conform to a user's face when the HMD device is worn by the user.

FIG. 7 also shows a head strap 781 operatively coupled to the HMD shield 760. The head strap 781 may be coupled to the HMD shield 760 via a shield hinge at a shield hinge location 779 that allows the head strap 781 to hinge about the shield hinge at a shield hinge location 779. This hinging about the shield hinge at a shield hinge location 779 allows the user to position a back end of the head strap 781 at any angular position along the back of the user's head for comfort or fit. This may allow for the HMD device 754 to be used by multiple different people regardless of the shapes of those users' heads.

In an embodiment, the HMD shield 760 and head strap 781 may be arranged at an adjustable angle relative to a horizontal plane. This adjustable angle of the HMD shield 760 and head strap 781 in FIG. 7 relative to the horizontal plane allows the head strap 781 to be arranged to not interfere with a user's ears. This may prevent the head strap 781 from crossing over the user's ears and preventing a user from using, for example, headphones during the operation of the HMD device 754. This is seen in FIG. 7 where the angle of the HMD shield 760 and head strap 781 cause the head strap 781 to pass above the user's ears when worn. Additionally, the adjustable angle of the HMD shield 760 and head strap 781 in FIG. 7 relative to the horizontal plane angles the camera/pass-through camera 761 downward at an angle that may create a better view of the user's hands by the camera/pass-through camera 761.

Figure 8:
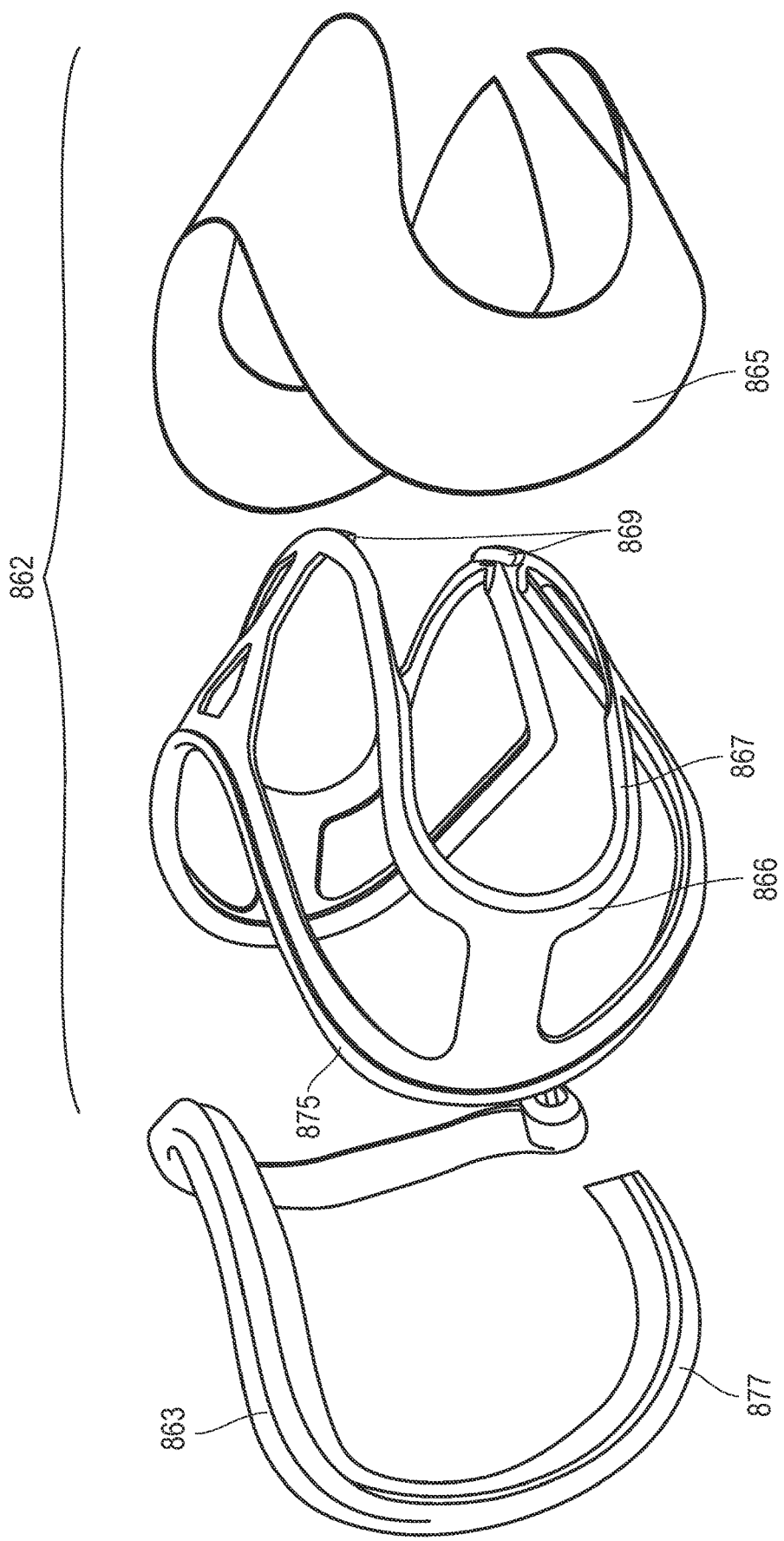
FIG. 8 is a graphic diagram exploded, perspective view of an HMD hood of an XR HMD device according to another embodiment of the present disclosure.

FIG. 8 is a graphic diagram exploded, perspective view of an HMD hood 862 of an XR HMD device according to another embodiment of the present disclosure. The HMD hood 862 in FIG. 8 shows a front aperture with a first edge or distal edge from the user around the front aperture having one or more hood teeth 869 and a shroud seal 867. The front aperture is to receive the HMD device into the HMD hood 862. FIG. 8 also shows the HMD hood 862 with the face mask 863 removed from the frame bead or frame lip 875 on a second edge or proximal edge around the back aperture of the shroud frame 866 that is closer to and faces the user while wearing the HMD device. FIG. 8 further shows the face mask 863 having a bead channel 877 in an embodiment. The bead channel 877 may receive the frame bead or frame lip 875 of the shroud frame 866 in order to install the face mask 863 onto the HMD hood 862. As described herein, the face mask 863 installed on the second edge or distal edge that is around the back aperture of the HMD hood 862 and is used to abut a user's face when the HMD device is worn. The face mask 863 may be made of a pliable material such as a foam or silicone in order to soften the interface between the HMD device and the user's face making the wearing of the HMD device more comfortable to the user.

The HMD hood 862 may include the fabric shroud 865 laid over a shroud frame 866. In an embodiment, the fabric shroud 865 may be secured to the shroud frame 866 via any clip, adhesive, screw, or other fastening device. In an embodiment, the fabric shroud 865 may be ultrasonically or heat welded to the shroud frame 866 at edge boundaries of the shroud frame 866. In an embodiment, the fabric shroud 865 includes any number of layers, for example three layers of fabric. A first fabric shroud layer may include directionally-oriented moisture wicking fibers. The directionally-orientated moisture wicking fibers may be arranged to wick the moisture to a less dense portion of the first fabric shroud layer that is away from the user-viewing area. This first fabric shroud layer may, therefore, prevent condensation from building up inside the HMD hood 862 and on the HMD video display, and prevent an uncomfortable physical environment for the user.

The fabric shroud 865 may further include, in an embodiment, a second layer and a third layer each used to prevent light from entering the HMD hood 862 and into the user-viewing area. The second layer may include fibers that are woven in a first direction while the third layer includes fibers woven in a second direction that is different from the first direction. In an embodiment, the direction of the woven fibers of the second layer and the third layer may be perpendicular to each other so that light may not pass through the fabric shroud 865 of the HMD hood 862. The weave or material of the second layer and third layer may be sufficient to allow the moisture wicked away from inside the HMD hood 862 by the first fabric shroud layer to pass through the second layer and third layer in those embodiments where the first layer is interior to the HMD hood 862 relative to the second and third layers. In another embodiment, the second or third layers of the fabric shroud 865 may be interior to the first layer of the fabric shroud 865.

The HMD hood 862 may further include one or more hood teeth 869 formed on the shroud frame 866 of the HMD hood 862. FIG. 8 shows two hood teeth 869 similar to those shown in FIG. 8. With a first hood tooth 869 on a top, distal edge of the shroud frame 866 and a second or additional hood tooth 869 formed at a distal, bottom edge of the shroud frame 866, the shroud frame 866 may be elastically bent so that the hood teeth 869 are separated further from each other. This separation of the hood teeth 869 away from each other may facilitate the user in installing or removing the HMD hood 862 with or from the HMD shield respectively. The hood teeth 869 seat or unseat in one or more shield slots (not shown) as described herein when aligned under the hood teeth 869.

In an embodiment, the shroud frame 866 may further include a shroud seal 867 which may be an edge lip formed along a distal edge surface of the shroud frame 866 that abuts portions of the HMD shield of the HMD device. The shroud seal 867 may be a portion of the shroud frame 866 that conforms to a surface of the HMD shield when the HMD hood 862 is installed. In an embodiment, the HMD shield includes a shield groove (not shown) that interfaces with the shroud seal 867 such as an edge lip formed on the shroud frame 866 of the HMD hood 862. This interfacing between the shroud seal 867 and shield groove prevents light from entering the user-viewing area within the HMD hood 862 thereby making the HMD hood 862 lightproof or nearly lightproof.

Figure 9:
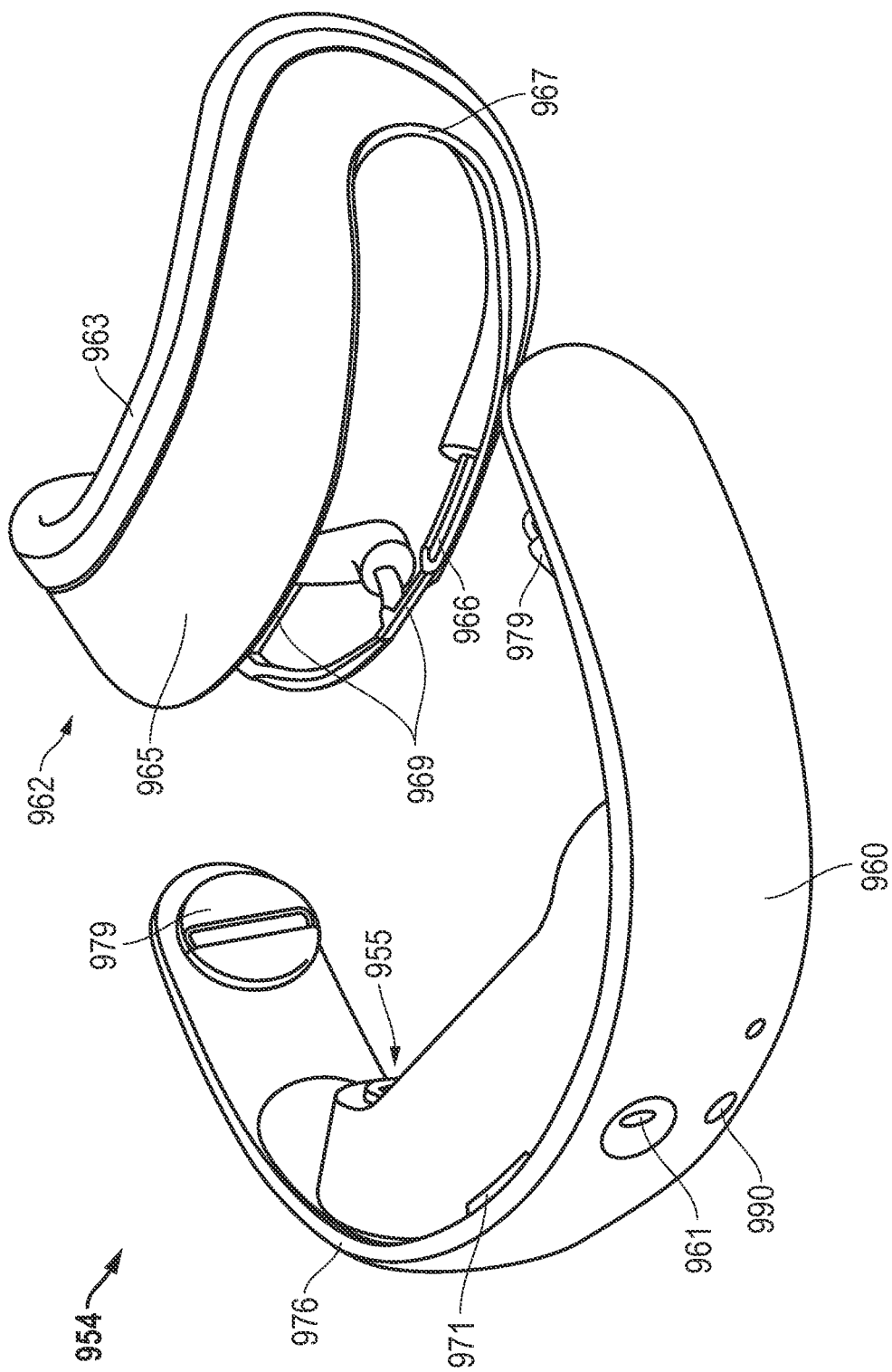
FIG. 9 is a graphic diagram perspective view of an HMD hood and an HMD shield of an HMD device according to an embodiment of the present disclosure.

FIG. 9 is a graphic diagram perspective view of an HMD hood 962 and an HMD shield 960 of an HMD device 954 according to an embodiment of the present disclosure. FIG. 9 shows a relative position of the HMD hood 962 to the HMD shield 960 when a user is installing the HMD hood 962 onto the HMD shield 960. Again, because the area between the user's eyes and the HMD video display 955 needs to be dark, the HMD hood 962 may prevent light from entering this area. In an embodiment, the HMD hood 962 may be nearly lightproof so that the user may view the images and videos presented to the user at the HMD video display 955. In an embodiment, the HMD hood 962 may include a shroud frame (not shown) that maintains a shape of a fabric shroud 965 around the user's eyes and away from the HMD video display 955. In an embodiment, the shroud frame of the HMD hood 962 may include a face mask 963 used to abut a user's face when the HMD device 954 is worn and shown installed in FIG. 9. The face mask 963 may be made of a pliable material such as a foam or silicone in order to soften the interface between the HMD device 954 and the user's face making the wearing of the HMD device 954 more comfortable to the user.

The HMD device 954 may include an HMD shield 960 in an embodiment. The HMD shield 960 may act as part of the housing on to which other components of the HMD device 954 may be secured or into which some of the hardware such as the HMD video display 955 of the HMD device 954 may be placed. For example, the HMD device 954 may include a camera/pass-through camera 961 used to provide data to a processing resource describing the location of the HMD device 954 within a physical environment. Additionally, the camera/pass-through camera 961 may provide images to the user via the HMD video display 955 of the physical environment around the user. The camera/pass-through camera 961 may be formed into a front portion of the HMD shield 960 and protected by the rigid housing of the HMD shield 960 from damage.

The HMD shield 960 may also house one or more IR emitters/IR detectors 990. In an embodiment, the IR emitters/IR detectors 990 or visible light versions of the same, for example, within either on the HMD device 954 (e.g., inward-out location detection) or located within the physical environment (e.g., outward-in location detection), may be used to triangulate or multilaterate the location of the HMD device 954 within the physical environment. In the example embodiment shown in FIG. 9, the IR emitters/IR detectors 990 may also be placed within the housing of the HMD shield 960 to protect the IR emitters/IR detectors 990 from damage.

The HMD hood 962 may include a fabric shroud 965 laid over a shroud frame and operatively coupled to the HMD shield 960 via and interaction between one or more shield slots 971 and one or more hood teeth 969 formed at a distal edge of the shroud frame 966. The shroud frame 966 may be a lightweight piece of plastic that is skeletonized and includes one or more supporting members for the fabric shroud 965 to be draped over the shroud frame 966. As shown in FIG. 9, the shroud frame 966 may include a distal edge that abuts the HMD shield 960 when inserted into the distal aperture of the HMD hood 962 between the hood teeth 969. The shroud frame 966 also includes a proximal edge that interfaces with a face mask 963 used to abut a user's face. The structure of the shroud frame 966 reduces the amount of materials used to form the HMD hood 962 thereby reducing the weight of the HMD hood 962 and, accordingly, the overall weight of the HMD device 954. The fabric shroud 965 may be made of any material that prevents light from entering through the HMD hood 962 and into the user-viewing area within the HMD device 954 such as that area between the user's eyes and the HMD video display 955 when the HMD device 954 is being worn.

In an embodiment, the fabric shroud 965 includes any number of layers, for example, three layers of fabric. A first fabric shroud layer may include directionally-oriented moisture wicking fibers. The first fabric shroud layer includes directionally-oriented moisture wicking fibers that traps microscopic droplets of sweat and other fluids and wicking them out of and away from the user-viewing area. The directionally-orientated moisture wicking fibers may be arranged to wick the moisture to a less dense portion of the first fabric shroud layer that is away from the user-viewing area. This first fabric shroud layer may, therefore, prevent condensation from building up inside the HMD hood 962, prevent fogging of the HMD video display 955, and prevent an uncomfortable physical environment for the user. The fabric shroud 965 may further include, in an embodiment, a second layer and a third layer each used to prevent light from entering the HMD hood 962 and into the user-viewing area. The second layer may include fibers that are woven in a first direction while the third layer includes fibers woven in a second direction that is different from the first direction. In an embodiment, the direction of the woven fibers of the second layer and the third layer may be perpendicular to each other so that light may not pass through the HMD hood 962. The weave and material used for the second layer and third layer may be sufficient to allow the moisture wicked away from inside the HMD hood 962 by the first fabric shroud layer to pass through the second layer and third layer.

The HMD hood 962 may further include one or more hood teeth 969 formed on the shroud frame 966 of the HMD hood 962. FIG. 9 shows a hood tooth 969 formed at a top, distal first edge around a front aperture of the HMD hood 962 while another hood tooth 969 is formed at a bottom, distal front edge of the shroud frame 966 at the bottom of the front aperture of the HMD hood 962. With a first hood tooth 969 on a top, distal edge of the shroud frame 966 and the second hood tooth 969 formed at a distal, bottom first edge of the shroud frame 966, the shroud frame 966 may be elastically bent so that the hood teeth 969 are separated further from each other when the HMD device 954 is inserted into the front aperture of the HMD hood 962. This separation of the hood teeth 969 away from each other may facilitate the user in installing or removing the HMD hood 962 with or from the HMD shield 960, respectively.

In an embodiment, the HMD device 954 is inserted into the front aperture of the HMD hood 962 by distending hood teeth 969 away from one another. Then, the hood teeth 969 may be placed or seated within a shield slot 971 formed in an HMD shield 960 portion of the HMD device 954 while installed or being installed by the user. When being installed and when the user or the sliding of the HMD device 954 into the front aperture to align the hood teeth 969 with the shield slot 971 releases the force used to separate the hood teeth 969 from each other, the hood teeth 969 are allowed to be seated into their respective shield slots 971 thereby securing the HMD hood 962 to the HMD shield 960 and the other parts of the HMD device 954. In some embodiments, a snap fit or interference fit secures the hood teeth 969 in the shield slot or slots 971. This allows a user to easily swap out a first HMD hood 962 for a second HMD hood 962 for cleaning or replacement. For example, the HMD device 954 may be provided with a plurality of different sized or extra HMD hoods 962. The different sizes of HMD hoods 962 may allow a user to select, from among the plurality of HMD hoods 962, a single HMD hood 962 that is sized for the user's face the best. Additionally, the user may select a specific HMD hood 962 to be used by the user throughout the lifetime of the HMD device 954. This may allow multiple users to operate the HMD device 954 using their own HMD hood 962. During use, the users operating the HMD device 954 may perspire or otherwise create a situation where bacteria or viruses can be spread. In order to mitigate this transmission of bacteria or viruses, each user of the HMD device 954 may be assigned an HMD hood 962 that the user may use with the HMD device 954. In an embodiment, the user may be allowed to purchase additional HMD hoods 962 for this purpose. In an embodiment, the HMD device 954 may be shipped to the user with a plurality of HMD hoods 962 as described herein. With the easy removal and coupling of the HMD hood 962 to the HMD shield 960 as described herein, the user is allowed to easily remove their assigned HMD hood 962 after using the HMD device 954 allowing the next user to couple their assigned HMD hood 962 to the HMD shield 960 of the HMD device 954.

In an embodiment, the shroud frame 966 may further include a shroud seal 967 formed along a distal edge surface of the shroud frame 966 that abuts portions of the HMD shield 960 of the HMD device 954. The shroud seal 967 may be a portion or a lip along a front edge of the shroud frame 966 that conforms to a surface of the HMD shield 960 when the HMD hood 962 is installed. In an embodiment, the HMD shield 960 includes a shield groove 976 that interfaces with the shroud seal 967, such as a lip, formed on the front edge of the shroud frame 966 around the front aperture of the HMD hood 962. This interfacing between the shroud seal 967 and shield groove 976 prevents light from entering the user-viewing area within the HMD hood 962 thereby making the HMD hood 962 nearly lightproof.

As described herein, the HMD hood 962 may include a face mask 963 on a second edge of the HMD hood 962 around a back aperture, the face mask 963 is used to abut a user's face when the HMD device 954 is worn. The face mask 963 may be made of a pliable material such as a foam or silicone in order to soften the interface between the HMD device 954 and the user's face making the wearing of the HMD device 954 more comfortable to the user. In an embodiment, the shroud frame 966 may include a frame bead or face mask lip formed along a proximal, second edge around the back aperture of the shroud frame 966 proximate to a user's face when the HMD device 954 is being worn. The frame bead or face mask lip may interface with a bead channel formed along a length of the face mask 963 that allows the face mask 963 to be wrapped around the frame bead securing the face mask 963 to the HMD hood 962.

The HMD device 954 may further include a head strap (not shown). In an embodiment, the head strap may be operatively coupled to the HMD shield 960 and extend away from the HMD shield 960. The head strap may be sized to fit around the back a user's head and is used to secure the HMD device 954 to the user's head and face. In an embodiment, the head strap may include adjustable straps that allow the user to loosen or tighten the head strap around the user's head. In an embodiment, the head strap may be made of an elastic material that may stretch around the user's head when the HMD device 954 is being worn. In an embodiment, the head strap may include a Velcro coupling device or a belt structure to allow the user to adjust the length of the head strap for a customized fit.

The head strap, in an embodiment, may be secured to the HMD shield 960 via a shield hinge 979. The shield hinge 979 may be allowed to rotate within the HMD shield 960 and include a loop or other coupling device used to secure the head strap to the shield hinge 979. In an embodiment, the head strap may be removed from the HMD shield 960 when the head strap is uncoupled from itself and passed through the loop or other coupling device of the shield hinge.

In an embodiment, the HMD shield 960 and head strap may be arranged at an adjustable angle relative to a horizontal plane. This adjustable angle of the HMD shield 960 and head strap relative to the horizontal plane allows the head strap to be arranged to not interfere with a user's ears. This may prevent the head strap from crossing over the user's ears and preventing a user from using, for example, headphones during the operation of the HMD device 954. In an embodiment, this adjustable angle of the HMD shield 960 and head strap causes the head strap to pass above the user's ears when worn. Additionally, the angle of the HMD shield 960 and head strap relative to the horizontal plane angles the camera/pass-through camera 961 downward at an angle that may create a better view of the user's hands by the camera/pass-through camera 961.

Figure 10:
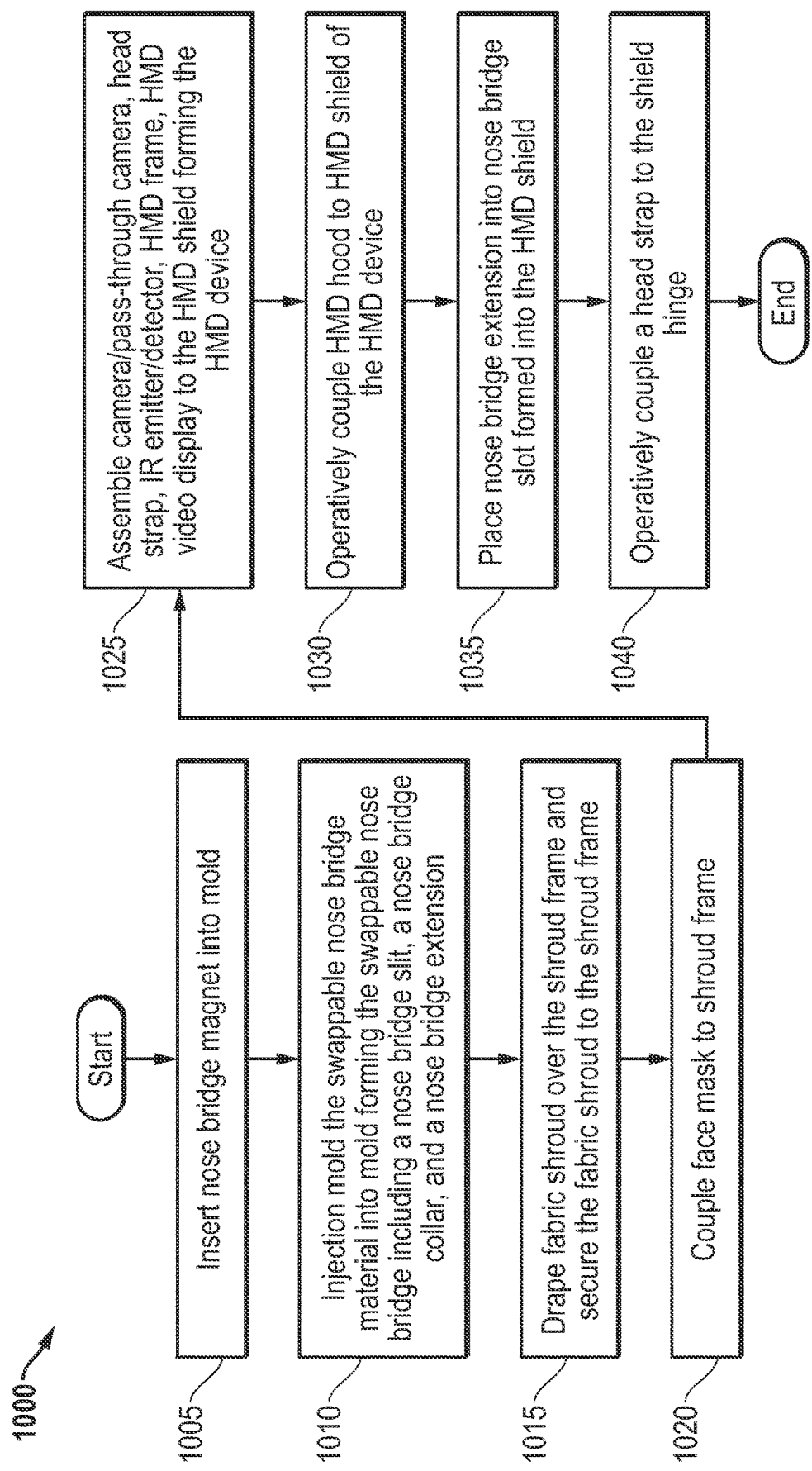
FIG. 10 is a flow diagram of a method of manufacturing an HMD device with a swappable nose bridge, head strap, and HMD hood according to an embodiment of the present disclosure.

FIG. 10 is a flow diagram of a method 1000 of manufacturing an HMD device with a swappable nose bridge, head strap, and HMD hood according to an embodiment of the present disclosure. The method 1000 includes, at block 1005, with inserting a nose bridge magnet into a mold. The mold described herein is used for the injection molding of the swappable nose bridges described herein. As such, because the nose bridge magnet is to be placed within the nose bridge extension, the nose bridge magnet may be placed in the mold at a location where the nose bridge extension will be formed within the mold.

The method 1000 at block 1005 may optionally include the placement of the shape metal alloy sheets, rods, wires, or other structures into this mold as well. As described herein, the shape metal alloy structures may be used to allow for the nose bridge flaps to be elastically bendable when the HMD device is being worn by the user. Because these structures of shape metal alloy are to be formed into (e.g., embedded into) the nose bridge flaps, the shape metal alloy structure may be placed within the mold in a location where the nose bridge flaps will be formed during the injection molding process.

The method 1000 further includes injection molding the swappable nose bridge by injecting, into the mold, a material used to form the swappable nose bridge at block 1010. This material may include a bendable or pliable plastic, a rubber, or a synthetic rubber among other types of materials. By injection molding the swappable nose bridge at block 1015, the nose bridge slit, nose bridge collar, and nose bridge extension may each be formed as described herein. In another example embodiment, the injection molding process may include a plurality of injection molding processes that includes removing an incomplete swappable nose bridge from a first mold, placing the incomplete swappable nose bridge into a second mold, and conducting a second injection molding process. This may be beneficial where, for example, the nose bridge magnet and shape metal alloy structures are to be individually added to a mold separately.

At block 1015, the method 1000 includes draping a fabric shroud over a shroud frame and securing the fabric shroud to the shroud frame. In an embodiment, the fabric shroud may include a plurality of fabric layers that block light from entering into the HMD hood and wicking moisture out form within the HMD hood. A first fabric shroud layer may include directionally-oriented moisture wicking fibers. The directionally-orientated moisture wicking fibers may be arranged to wick the moisture to a less dense portion of the first fabric shroud layer that is away from the user-viewing area. This first fabric shroud layer may, therefore, prevent condensation from building up inside the HMD hood and on the HMD video display, and prevent an uncomfortable physical environment for the user.

The fabric shroud may further include, in an embodiment, a second layer and a third layer each used to prevent light from entering the HMD hood and into the user-viewing area. The second layer may include fibers that are woven in a first direction while the third layer includes fibers woven in a second direction that is different from the first direction. In an embodiment, the direction of the woven fibers of the second layer and the third layer may be perpendicular to each other so that light may not pass through the HMD hood. The weave and material of the second layer and third layer may be sufficient to allow the moisture wicked away from inside the HMD hood by the first fabric shroud layer to pass through the second layer and third layer in those embodiments where the first layer is interior to the HMD hood relative to the second and third layers. In another embodiment, the second or third layers of the fabric shroud may be interior to the first layer of the fabric shroud. In an embodiment, the fabric shroud may be ultrasonically or heat welded to the shroud frame at edge boundaries of the shroud frame.

At block 1020, the method 1000 includes coupling a face mask to the shroud frame. In an embodiment, the shroud frame may include a frame bead formed along a proximal edge of the shroud frame. The frame bead may interface with a bead channel formed along a length of the face mask that allows the face mask to be wrapped around the frame bead securing the face mask to the shroud frame of the HMD hood.

At block 1025 the method 1000 includes the construction of the HMD device worn by the user. This process at block 1025 may include assembling a camera/pass-through camera, head strap, IR emitter/detector, HMD video display, and HMD processor and storage to the HMD shield thereby forming the HMD device. These processes may include the operative coupling of the IR emitter/detector, the camera/pass-through camera, and HMD video display to, for example, a printed circuit board (PCB) within the HMD shield so that these devices may be operatively coupled, via PCB circuitry, to the HMD connection wire described in connection with FIG. 2 and to other processing, power, and data storage resources also in the HMD shield or at a wearable HMD compute stick or other compute compartment as described in various embodiments herein.

At block 1030, the method 1000 includes operatively coupling the HMD hood to the HMD shield of the HMD device. In an example embodiment where a first hood tooth is formed on a top, distal edge of the shroud frame and a second or additional hood tooth is formed at a distal, bottom edge of the shroud frame, the shroud frame may be elastically bent so that the hood teeth are separated further from each other. This separation of the hood teeth away from each other may facilitate the user in installing or removing the HMD hood with or from the HMD shield respectively to seat or unseat the hood teeth in one or more shield slots as described herein. The shroud frame, as described herein, may include a distal edge that abuts the HMD shield when inserted into the distal aperture of the HMD hood between the hood teeth. The shroud frame also includes a proximal edge that interfaces with a face mask used to abut a user's face. The HMD device is inserted into the front aperture of the HMD hood by distending hood teeth away from one another. Then, the hood teeth may be placed or seated within a shield slot formed in an HMD shield portion of the HMD device while installed or being installed by the user. When being installed and when the user or the sliding of the HMD device into the front aperture to align the hood teeth with the shield slot releases the force used to separate the hood teeth from each other, the hood teeth are allowed to be seated into their respective shield slots thereby securing the HMD hood to the HMD shield and the other parts of the HMD device. In an embodiment, the HMD shield includes a shield groove that interfaces with the shroud seal, such as a lip, formed on the front edge of the shroud frame around the front aperture of the HMD hood. This interfacing between the shroud seal and shield groove prevents light from entering the user-viewing area within the HMD hood thereby making the HMD hood nearly lightproof.

The method 1000 further includes placing the nose bridge extension into the nose bridge slot formed into the HMD shield at block 1035 according to embodiments herein to form an interference fit or a magnetic coupling. This process may be completed by a factory worker in an embodiment. In another embodiment, this process may be completed by an end user where, for example, the user is provided with an option to switch out and use multiple swappable nose bridges that are provided to the user at the time of purchase.

In an embodiment, the method 1000 further includes operatively coupling a head strap to the shield hinge formed on the HMD shield. As described herein, the shield hinge may be allowed to rotate within the HMD shield such that the head strap is angularly adjustable on a user's head. This shield hinge includes a loop or other coupling device used to secure the head strap to the shield hinge. By looping the head strap through the loop, for example, a portion of the head strap may be secured to itself allowing for a user to alter the length of the head strap later. In an embodiment, the head strap may include velcro that may secure the head strap on itself. Once assembled, the method 600 may end.

The blocks of the flow diagrams of FIG. 10 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An extended reality (XR) head-mounted display (HMD) device comprising:
    a processor;
    a memory device;
    a battery;
    an HMD video display to present to a user an extended reality image of an environment;
    an HMD shield formed to be fitted around a user's eyes and to house the HMD video display;
    an HMD hood comprising a fabric shroud formed over a shroud frame operatively coupled to the HMD shield;
    the fabric shroud including a first layer including directionally-oriented moisture wicking fibers;
    a shroud seal formed on the shroud frame to interface with a shield groove formed on the HMD shield, the shroud seal to prevent light from leaking into an interior of the HMD hood; and
    a head strap operatively coupled to the HMD shield via a shield hinge to secure the HMD device to the user's head.

2. The XR HMD device of claim 1 further comprising:
    a swappable nose bridge, including:
        a nose bridge extension to fit within a nose bridge slot formed into the HMD housing; and
        a nose bridge magnet formed at the nose bridge extension to magnetically engage within the nose bridge slot formed in the HMD housing.

3. The XR HMD device of claim 1, wherein the head strap is angled up from a horizontal position relative to the HMD shield.

4. The XR HMD device of claim 1, further comprising:
    a face mask operatively coupled to the shroud frame.

5. The XR HMD device of claim 1, further comprising:
    a hood tooth formed on the shroud frame to operatively couple the HMD hood to the HMD shield via a shield slot formed in the HMD shield.

6. The XR HMD device of claim 1 further comprising:
    an XR handheld controller operatively coupled to the XR HMD device to allow a user to interact with the XR image of the environment.

7. The XR HMD device of claim 1 further comprising:
    the fabric shroud including:
        a second layer including fibers woven in a first direction; and
        a third layer including fibers woven in a second direction different from the first direction.

8. The XR HMD device of claim 1, wherein the fabric shroud is welded onto the shroud frame along a fabric shroud perimeter formed on the shroud frame.

9. The XR HMD device of claim 1 further comprising:
    a wired connection operatively coupling the HMD shield to a compute stick, the compute stick housing the processor, memory device, and battery off from the HMD shield; and
    the compute stick including a body coupling device for the compute stick to be worn on the body of the user.

10. An extended reality (XR) head mounted display (HMD) device comprising:
    an HMD video display to present to a user an extended reality image of an environment;
    a compute stick operatively coupled to the HMD video display via a wired connection including:
        a processor;
        a memory device; and
        a battery;
    an HMD shield formed to be fitted around a user's eyes and to house the HMD video display;
    an HMD hood comprising a fabric shroud formed over a shroud frame operatively coupled to the HMD shield; and
    a head strap operatively coupled to the HMD shield via a shield hinge to secure the HMD device to the user's head.

11. The XR HMD device of claim 10 further comprising:
    the compute stick including a body coupling device for the compute stick to be worn on the body of the user.

12. The XR HMD device of claim 10 further comprising:
    a swappable nose bridge, including:
        a nose bridge extension to snap fit within a nose bridge slot formed into the HMD housing.

13. The XR HMD device of claim 10, wherein the head strap is adjustable to be angled up from a horizontal position.

14. The XR HMD device of claim 10, further comprising:
    a face mask operatively coupled to the shroud frame.

15. The XR HMD device of claim 10 further comprising:
a hood tooth formed on the shroud frame to operatively couple the HMD hood to the HMD shield via a shield slot formed in the HMD shield.

16. The XR HMD device of claim 10 further comprising:
a shroud seal formed on the shroud frame to interface with a shield groove formed on the HMD shield, the shroud seal to prevent light from leaking into an interior of the HMD hood.

17. The XR HMD device of claim 10 further comprising:
the fabric shroud including:
- a first layer including directionally-oriented moisture wicking fibers;
- a second layer including fibers woven in a first direction; and
- a third layer including fibers woven in a second direction different from the first direction.

18. An extended reality (XR) head-mounted display (HMD) device comprising:
a processor;
a memory device;
a power management unit (PMU);
an HMD shield formed to be fitted around a user's eyes and to house:
  an HMD video display to present to a user an extended reality (XR) image of an environment; and
  a camera to detect an image of the physical environment around the HMD device;
an XR handheld controller to allow a user to interact with the XR image of the environment;
an HMD hood comprising a fabric shroud formed over a shroud frame operatively coupled to the HMD shield; and
a head strap operatively coupled to the HMD shield via an angularly adjustable shield hinge to secure the HMD device to the user's head.

19. The XR HMD device of claim 18 further comprising:
a swappable nose bridge, including:
  a nose bridge extension to fit within a nose bridge slot formed into the HMD housing; and
  a nose bridge magnet formed at the nose bridge extension to magnetically engage within the nose bridge slot formed in the HMD housing.

20. The XR HMD device of claim 18 further comprising:
the fabric shroud including:
- a first layer including directionally-oriented moisture wicking fibers;
- a second layer including fibers woven in a first direction; and
- a third layer including fibers woven in a second direction different from the first direction.

* * * * *